US008340259B2

(12) United States Patent
Mahone et al.

(10) Patent No.: US 8,340,259 B2
(45) Date of Patent: *Dec. 25, 2012

(54) METHOD AND APPARATUS FOR PROVIDING FRAUD DETECTION USING HOT OR COLD ORIGINATING ATTRIBUTES

(75) Inventors: Saralyn M. Mahone, Colorado Springs, CO (US); Matthew J. Gilbert, Columbus, OH (US); Thomas E. Stepp, Canal Winchester, OH (US); Arthur L. Springer, Waterloo, IA (US); John Hans Van Arkel, Colorado Springs, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/633,538

(22) Filed: Dec. 8, 2009

(65) Prior Publication Data

US 2010/0080372 A1    Apr. 1, 2010

Related U.S. Application Data

(63) Continuation of application No. 11/141,364, filed on May 31, 2005, now Pat. No. 7,817,791, which is a continuation-in-part of application No. 10/843,856, filed on May 12, 2004, now Pat. No. 7,971,237.

(60) Provisional application No. 60/667,310, filed on Apr. 1, 2005, provisional application No. 60/470,917, filed on May 15, 2003.

(51) Int. Cl.
*H04M 15/00* (2006.01)
*H04M 17/00* (2006.01)

(52) U.S. Cl. ............... 379/145; 379/93.02; 379/114.02; 379/127.02

(58) Field of Classification Search ............... 379/91.01, 379/93.02, 93.03, 112.01, 114.01, 114.03, 379/114.04, 114.14, 121.01, 127.01, 143, 379/145, 114.02, 127.02; 726/22, 26, 27; 706/3, 46, 48

See application file for complete search history.

(56) References Cited

U.S. PATENT DOCUMENTS 5,333,185 A    7/1994    Burke et al.
(Continued)

FOREIGN PATENT DOCUMENTS

WO    WO-99/13427    3/1999
(Continued)

OTHER PUBLICATIONS

ITU, "Interface Between Data Terminal Equipment (DTE) and Data Circuit-Terminating Equipment (DCE) for Terminals Operating in the Packet Mode and Connected to Public Data Networks by Dedicated Circuit", ITU-T Recommendations X.25, Oct. 1996.

(Continued)

*Primary Examiner* — Binh Tieu

(57) ABSTRACT

An approach provides fraud detection in support of data communication services. A list of single-event attributes (e.g., hot or cold attributes) is generated and includes a network address of an end user host originating a data call or a calling party identification (e.g., Automatic Number Identification (ANI) or an originating Calling Line Identification (CLI)) for network access, wherein entries of the list specify values of the hot attributes. An attribute value associated with the data call is compared with the entries. A fraud alert is generated if the attribute value matches one of the entries.

20 Claims, 11 Drawing Sheets

U.S. PATENT DOCUMENTS

| | | | |
|---|---|---|---|
| 5,345,595 | A | 9/1994 | Johnson et al. |
| 5,504,810 | A | 4/1996 | McNair |
| 5,602,906 | A | 2/1997 | Phelps |
| 5,627,886 | A | 5/1997 | Bowman |
| 5,706,338 | A | 1/1998 | Relyea et al. |
| 5,734,977 | A | 3/1998 | Sanmugam |
| 5,768,354 | A | 6/1998 | Lange et al. |
| 5,839,063 | A | 11/1998 | Lee |
| 5,953,652 | A | 9/1999 | Amin et al. |
| 6,157,707 | A | 12/2000 | Baulier et al. |
| 6,163,604 | A | 12/2000 | Baulier et al. |
| 6,208,720 | B1 * | 3/2001 | Curtis et al. .......... 379/114.14 |
| 6,259,778 | B1 | 7/2001 | Corwith |
| 6,266,525 | B1 | 7/2001 | Peterson |
| 6,377,672 | B1 * | 4/2002 | Busuioc .......... 379/189 |
| 6,437,812 | B1 * | 8/2002 | Giles et al. .......... 715/853 |
| 6,570,968 | B1 | 5/2003 | Marchand et al. |
| 6,571,290 | B2 | 5/2003 | Selgas et al. |
| 6,643,362 | B2 | 11/2003 | Hogan et al. |
| 6,721,284 | B1 | 4/2004 | Mottishaw et al. |
| 6,873,617 | B1 * | 3/2005 | Karras .......... 370/389 |
| 7,142,651 | B2 * | 11/2006 | Ronen et al. .......... 379/114.14 |
| 7,197,560 | B2 * | 3/2007 | Caslin et al. .......... 709/224 |
| 7,231,657 | B2 | 6/2007 | Honarvar et al. |
| 7,234,156 | B2 | 6/2007 | French et al. |
| 7,308,714 | B2 | 12/2007 | Bardsley et al. |
| 2001/0050984 | A1 | 12/2001 | Jordan |
| 2002/0082886 | A1 | 6/2002 | Manganaris et al. |
| 2002/0103899 | A1 | 8/2002 | Hogan et al. |
| 2002/0188712 | A1 * | 12/2002 | Caslin et al. .......... 709/223 |
| 2003/0005326 | A1 | 1/2003 | Flemming |
| 2003/0172294 | A1 | 9/2003 | Judge |
| 2003/0185361 | A1 | 10/2003 | Edwards |
| 2004/0008717 | A1 | 1/2004 | Verma et al. |
| 2004/0015497 | A1 | 1/2004 | Swarna et al. |
| 2004/0030657 | A1 | 2/2004 | Holm-Blagg et al. |
| 2004/0153382 | A1 | 8/2004 | Boccuzzi et al. |
| 2004/0234056 | A1 | 11/2004 | Heilmann et al. |
| 2005/0160280 | A1 | 7/2005 | Caslin et al. |
| 2005/0268113 | A1 | 12/2005 | Mahone et al. |
| 2006/0124732 | A1 | 6/2006 | Dentlinger |
| 2008/0267375 | A1 | 10/2008 | Betts et al. |

FOREIGN PATENT DOCUMENTS

| | | |
|---|---|---|
| WO | WO-03/94562 | 11/2003 |

OTHER PUBLICATIONS

Mitton et al., "Network Access Server Requirements Next Generation (NASREQNG) NAS Model", Internet Engineering Task Force, Request for Comments: 2881, Jul. 2000.,.

Rigney et al., "Remote Authentication Dial in User Service (RADIUS)", Internet Engineering Task Force, Request for Comments: 2865, Jun. 2000.

* cited by examiner

US 8,340,259 B2

METHOD AND APPARATUS FOR PROVIDING FRAUD DETECTION USING HOT OR COLD ORIGINATING ATTRIBUTES

RELATED APPLICATIONS

The present application is a continuation of U.S. patent application Ser. No. 11/141,364 filed May 31, 2005, which is a Continuation-In-Part of U.S. patent application Ser. No. 10/843,856 filed May 12, 2004; the contents of which are hereby incorporated by reference.

FIELD OF THE INVENTION

The present invention relates to communications systems, and more particularly, to fraud detection in remote access of data services.

BACKGROUND OF THE INVENTION

Modern communication services have evolved around advancements made in data networking technologies. Data transport is one form of such commercially offered communication services, whereby customers (or subscribers) have a need to communicate with one another, access applications on a host computer or otherwise transfer data from one point to another. Further, these users typically require access the global Internet with its vast knowledge base and applications. The popularity of data services has spawned the fraudulent usage of such services, akin to theft of long distance telephony services. Conventional fraud detection techniques have centered around telephony systems, and thus, are not well suited to fraud prevention in data communication systems, which exhibit different characteristics from that of circuit switched voice calls.

Service providers recognize the advantage of using the existing telephony infrastructure to provide ready access to data services. In many instances, users particularly when not at their offices do not have readily available access to the corporate local area network (LAN), corporate intranet, or the Internet. Given the modern day reliance on e-mail and the Internet, these business users require access to such resources from various locations throughout the world. To address this demand for remote access, service providers have implemented so-called "dial-up services," whereby a user may access a data network by a using, for example, a modem through a telephone connection. In this manner, a user may obtain a connection to the data network anywhere a reliable telephone connection is available.

One common example of dial-up access is the manner in which many residential and small business users access the Internet by subscribing to an Internet Service Provider (ISP). A user with a computer and a modem can dial a telephone number corresponding to the service provider and obtain a connection through the service provider to the Internet. In a similar manner, other dial-up access services have been known by which host computers may be directly dialed. Types of data transport that may be accessed in this manner include, for example, an International Telecommunications Union (ITU) X.25-compliant packet transport, Internet Protocol (IP) transport, or other forms of packetized communications. In most cases, service providers charge fees to users for using the communications resources of the service provider and possibly for accessing a particular host or service.

Another example of dial-up services relates to virtual private networks (VPNs). For a business enterprise having many geographically dispersed locations and having sporadic communications needs, it can be cost effective to subscribe to or utilize dial-up access to a data network rather than lease a dedicated line. For example, as employees of a business travel, dial-up access provides wide coverage and increases the likelihood that a traveler can reach needed resources and services of the back office. Additionally, dial-up access is useful for occasional work-at-home situations.

Unfortunately, the convenience of access to data services has also stimulated fraudulent usage, resulting in significant loss of revenue for the service provider. Fraud perpetrators gain access to the transport network to reach specific hosts and then use the services of the host. These "hackers" can breach the security of the information on the host, and interfere with the operation of the host or attempt other forms of attacks. Fraud is also committed to gain free access to the Internet or simply to provide data transport without incurring charges, leaving paying users to bear the costs. Further, such unauthorized access (or usage) can overwhelm network resources, even to the point of interfering with legitimate communications.

Fraud detection and redress are also complicated by the intricate interplay of multiple service providers and their partnership arrangements. For instance, in some areas (notably some countries), a given service provider may not have a point of presence that is reachable by a local telephone call. To better serve subscribers over a wide area of coverage, a service provider will often contract with an intermediate service provider to extend coverage to areas or countries not directly covered by the primary service provider. The subscriber conducts communications through the primary service provider by way of the intermediate service provider's facilities, wherein the primary service provider provides compensation to the intermediate service provider at an agreed upon rate. The intermediate service provider's network is thus referred to as a "partner network" relative to the primary service provider's resources.

Undoubtedly, when one or many fraud perpetrators gain access to network resources, the results are costly both for the service provider and the customer. A customer (such as a large organization or enterprise) may fail to notice charges caused by fraudulent use and unwittingly pay for the use by the fraudster. In another scenario, the costs incurred by the fraudster may be so exorbitant that the customer refutes the bill and the service provider is left to absorb the lost revenues or reach a compromise with the customer over the disputed billing. As a further detriment, for fraudulent traffic originating through a partner network, the first service provider may be obligated to compensate the second service provider even though the first service provider cannot collect charges arising from the fraudulent use of the network. Additionally, excessive fraud can impact the reliability and/or quality of the network (e.g., saturation of network resources, etc.). The service provider may also face loss of customers, who perceive that the service provider is incapable of providing ample network security or cannot properly address abuse.

Therefore, fraudulent abuse of network resources consumes time and money of customers and service providers and may threaten the operation of the network. As a further exposure to the service providers as described above, a given service provider experiencing fraud may have to pay settlements to other service providers to whom payment is owed, regardless of the fraudulent nature of the traffic.

Therefore, there is a need for early detection and prevention of fraud with respect to data communication services.

SUMMARY OF THE INVENTION

These and other needs are addressed by the present invention, in which an approach for providing detection of fraudulent use of a data call for network access is disclosed. This approach advantageously reduces the heavy cost of fraud associated with data communication services.

According to one aspect of the present invention, a method for detecting unauthorized use of data services is disclosed. The method includes generating a list of single-event attributes that include a network address of an end user host originating a data call for network access, wherein entries of the list specify values of the single-event attributes. The method also includes comparing an attribute value associated with the data call with the entries. The method further includes generating a fraud alert if the attribute value matches one of the entries.

According to another aspect of the present invention, an apparatus for detecting unauthorized use of data services is disclosed. The apparatus includes a processor configured to generate a list of single-event attributes that include a network address of an end user host originating a data call for network access, wherein entries of the list specify values of the single-event attributes. The apparatus also includes a memory configured to store the list, wherein the processor compares an attribute value associated with the data call with the entries and generates a fraud alert if the attribute value matches one of the entries.

According to yet another aspect of the present invention, a system for detecting unauthorized use of data services is disclosed. The system includes means for generating a list of single-event attributes that include a network address of an end user host originating a data call for network access, wherein entries of the list specify values of the single-event attributes. The system also includes means for comparing an attribute value associated with the data call with the entries. Further, the system includes means for generating a fraud alert if the attribute value matches one of the entries.

According to yet another aspect of the present invention, a method for detecting unauthorized use of data services is disclosed. The method includes generating a list of single-event attributes associated with a data call for network access, wherein entries of the list specify values of the single-event attributes, and the data call is a dial-up call. The single-event attributes includes a caller identification attribute specifying an originating Automatic Number Identification (ANI) or an originating Calling Line Identification (CLI). Also, the method includes comparing an attribute value associated with the data call with the entries. Further, the method includes generating a fraud alert if the attribute value matches one of the entries.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for detecting fraudulent use of data communication services are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to specific examples of networks and protocols, such as an Internet Protocol (IP)-based network and an X.25 network, it is contemplated that other equivalent communication networks and protocols can be utilized.

Figure 1A:
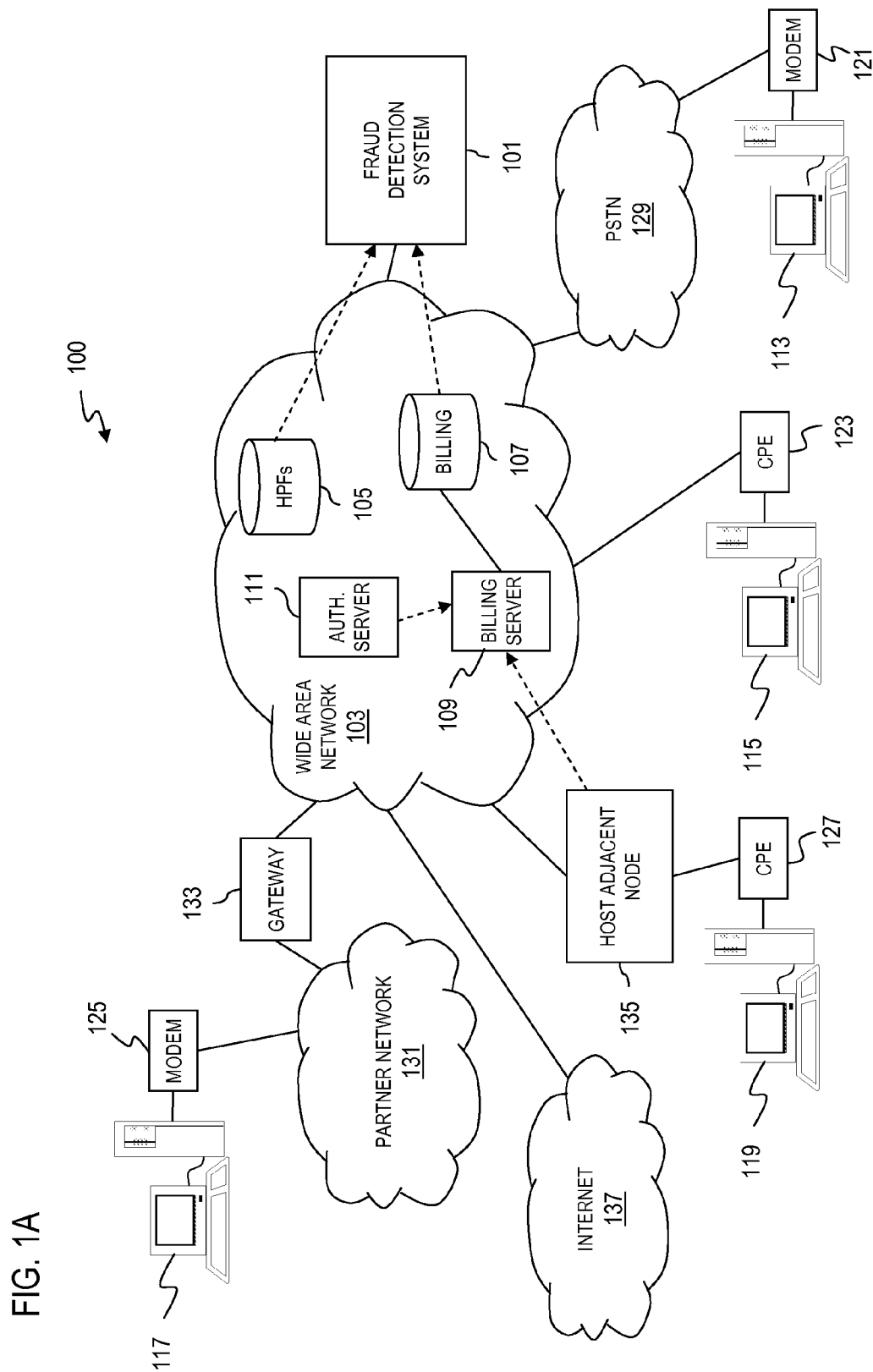
FIGS. 1A and 1B are diagrams, respectively, of a communication system employing a fraud detection system for supporting remote access services, and the layered architecture of the fraud detection system, according to an embodiment of the present invention.
Figure 1B:
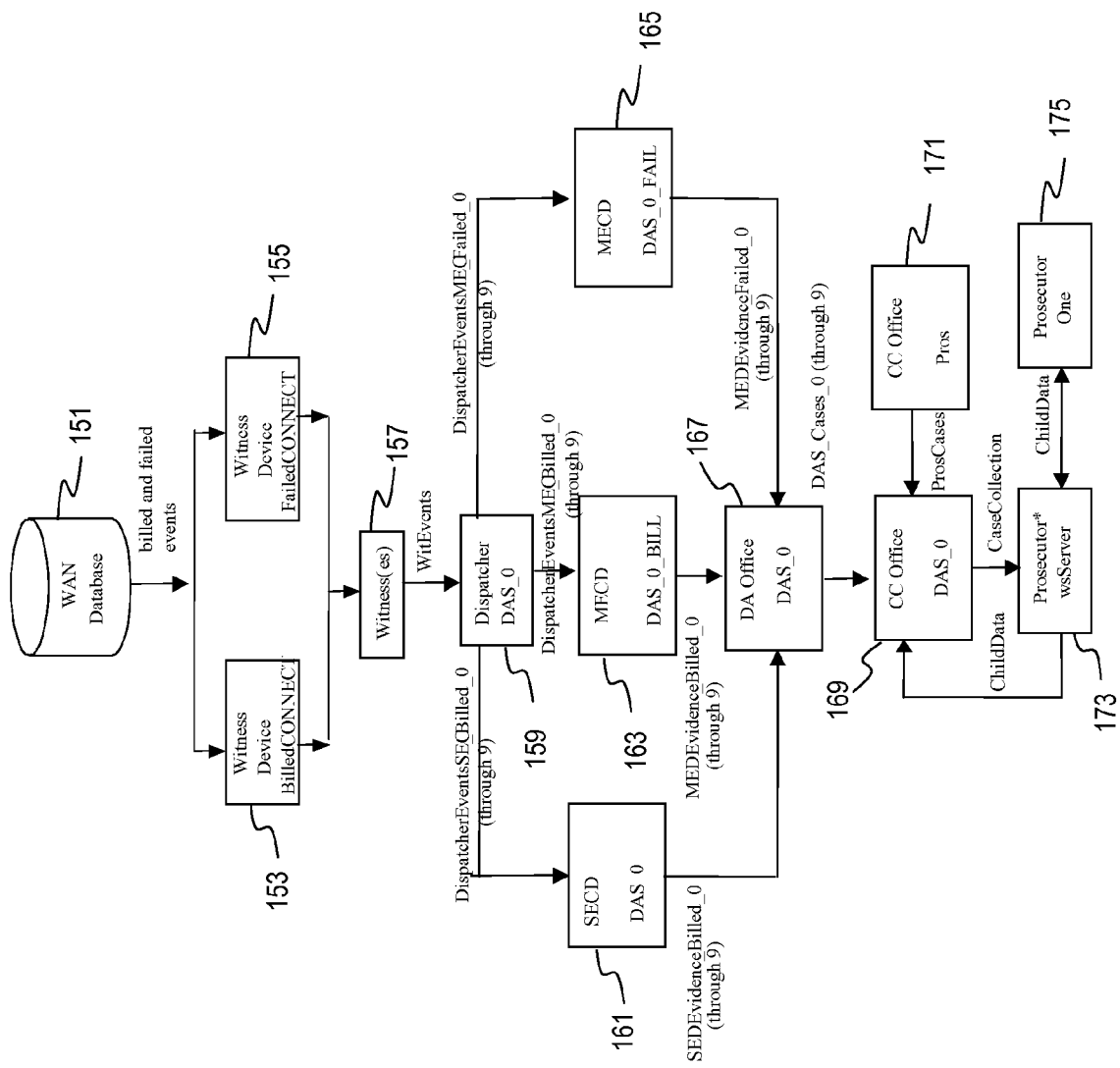

FIGS. 1A and 1B are diagrams, respectively, of a communication system employing a fraud detection system for supporting remote access services and the layered architecture of the fraud detection system, according to an embodiment of the present invention. A data communication system 100 includes a fraud detection system (or fraud monitoring system) 101 that receives data files relating to monitored activities from a Wide Area Network (WAN) network 103. In particular, the WAN 103 houses data collection databases 105, 107 that store the data files, which can retrieved by the fraud detection system 101, for example. Alternatively, the data files can be streamed for more expedient delivery of the information. The databases 105, 107 include Host Parameter File (HPF) database and a billing database 107, respectively. The billing database 107 communicates with a billing server 109 that generates billing data relating to the communication sessions supported across the WAN 103. The billing server 109 also has connectivity to an authentication server 111, which regulates, in part, the login procedures for remote access to the WAN 103. The term "remote access" refers to the communication with the authentication server 111 for access to the resource of the WAN 103; exemplary remote access mechanisms include dial-up access using a telephone connection.

As seen in FIG. 1A, the WAN 103 can be accessed by a number of end users via hosts 113, 115, 117, 119 through a variety of networks and nodes and corresponding access equipment 121, 123, 125, 127, which can include a modem, a network interface card (NIC) coupled to an access device or customer premise equipment (CPE), etc. depending on the particular network (e.g., Digital Subscriber Line (DSL) network, cable network, telephone network, etc.). For example, such networks can include a public switched telephone network (PSTN) 129, and a partner packet switched network 131 that is accessible through a gateway 133. In addition, the WAN 103 can extend its reach via a host adjacent node 135. One contemplated data service that is provided to the host subscribers is access to the global Internet 137.

In support of fraud monitoring, the fraud detection system 101 supports a number of functions. The system 101 provides an interface with external systems; for example, to receive information on monitored activities (e.g., billed connection and failed authentication events) through, for instance, a once-a-day (or more frequently, depending on the application) flat file transfer. The system 101 detects and analyzes suspected fraud by applying various detection techniques to user session events, and generating alarms when suspicious patterns are detected. The fraud detection system 101 provides case management by correlating alarms into cases and prioritizing them for analysis; the resultant information can be output to a Graphical User Interface (GUI) in form of Case Summary and Case Detail screens.

To appreciate the advantages of the fraud detection system 101, according to the present invention, it is instructive to understand the challenges associated with fraud detection in the context of data communication services, as opposed to traditional telephony services.

Whereas telephony fraud detection is mostly concerned with completed calls and the duration of such calls, dial-up services exhibit other characteristics requiring greater analysis. For example, in telephony a series of calls to non-working numbers is usually innocuous, whereas in dial-up services a series of failed log-in attempts, particularly involving a progression or sequence of attempted user IDs or passwords, can indicate a purposeful hacking attempt. In data calls, such as dial-up call services, factors like log-in frequency, geographic diversity, and simultaneity of usage are meaningful in effective fraud detection, and hence, is profiled on a "per usage account" basis to accurately distinguish fraudulent patterns from normal use.

A "usage account" refers to any arrangement among an entity and a service provider. As used herein, the term "usage account" may refer to an arrangement involving a single user or a large group of users such as a business enterprise wherein the usage by all users is accounted for collectively. Thus, where data is collected for a given user ID or for all use by a given business enterprise, the term "usage account" applies to both. Both individual users and groups of users may exhibit characteristic patterns of usage. Unexpected or unexplained changes in usage patterns for a given usage account, whether considered individually or across a population of users in an enterprise, may indicate fraud activity. Adding to the challenge of fraud prevention is the fact that some individual usage accounts are intended to be shared by individuals—and others are not. Without stored usage profile information, it is not apparent to the analyst whether the usage account should be shared.

Data relating to sessions and unsuccessful logon events may be accumulated, analyzed and reported in terms of several different categorizations. It is possible to assemble information pertaining to a given host or domain to provide a view of log-in and usage across all User IDs, for example. It may be desirable to also monitor use of a specific host/user ID. On a more global scale, statistics may be collected and analyzed based on originating country, meaning across all activity and host/user IDs involving that country. Similarly, it may be useful to classify information by a particular partner network to look for patterns at that level.

With respect to dial-up access services, patterns of normal usage may vary widely from one account to another. Some businesses, such as a nationwide delivery service, may employ a large number of mobile devices that record deliveries, dispatching and other transactions. Communications for such accounts may comprise a large number of short duration (possibly 30 seconds or less) communications sessions each day. Due to a variety of conditions, it is also possible that many of the log-on attempts by the mobile devices may initially fail. This pattern of high usage and high log-in failure may be deemed perfectly normal for this type of account. In fact, in accordance with an aspect of the present invention, the ratio of bad logon attempts to successful attempts is a meaningful index of behavior for a given account.

In other cases, a given account may maintain a constant communications session by which a remote device may send telemetry information to a host system. The session may remain continually active, 24 hours-a-day for months or years at a time. While it may seem pointless to monitor such usage, there is always the possibility that a fraudulent party may determine how to use the same account to conduct other sessions. It is desirable then to monitor for multiple simultaneous log-ins, geographically diverse usage, and usage per day exceeding 24 hours. It is important not to let the prolonged connection times, which are actually normal for this type of account, to "mask" other, perhaps more subtle, abnormal behavior. The system 101 can receive "intermediate" session duration records. In other words, if the user never hangs up, a duration record is never collected and sent to the system 101. To address this, a "session-in-progress" record can be transmitted periodically (e.g., every hour) to indicate that a session has been initiated and it is still active.

As evident from the above discussion, fraud in the context of dial-up services presents a unique challenge over traditional telephony services. According to an embodiment of the present invention, the fraud detection system 101 addresses the above challenges by accounting for the following factors in its analysis of fraudulent use: host names/domain names, country blocking, terminating class, originating calling party directory number (e.g., Automatic Number Identification (ANI) or Calling Line Identification (CLI)), number of originating countries, and failure codes. It is noted that other factors (e.g., communication session durations, number of failed attempts, etc.) can be utilized as well, depending on the particular profile desired.

An entirely different facet to fraud monitoring of data calls (e.g., dial-up services) relates to unsuccessful log-in attempts. A high incidence of failed log-in attempts can, in some cases, indicate attempted "hacking" or other forms of abuse. In particular, a fraud perpetrator may obtain a user ID and set about guessing passwords or may try to guess a host name. Often, the attempt to hack a host name is evidenced by incorrect host names that are similar to the actual name. For example, a series of attempted logons using invalid host names like "ACMEnews" may be an attempt to guess a valid name such as "ACMENewsCorp." Occasionally, the invalid attempts appear to be converging on a desired hacking target. Such attempts can serve to indicate a problem with the authentication system—for example, the system currently is not accepting legitimate user IDs and passwords.

One pattern that often occurs when access to communications service has been stolen is rapid, often exponential, acceleration in usage. A fraud perpetrator may obtain a user ID and password to get onto a service and then may sell or distribute the user ID/password for use by others. As the access information is passed to a growing chain of illegitimate users, the incidence of logons and simultaneous logons escalates quickly. With a fraud monitoring system 101 reviewing account activity on a frequent basis, this type of usage acceleration can readily be detected as this behavior is almost always atypical for an established, legitimate account. Early detection of the fraud and disabling of the compromised user ID and password can limit the damage and is far more preferable to the customer than unexpectedly receiving a multi-million dollar invoice when their normal bills have historically been in the thousands.

As in the field of controlling fraud losses in telephone networks, one approach for curtailing losses due to dial-up communications fraud is to identify countries exhibiting a high incidence of fraudulent activity and to simply block communications attempts from those countries. Unfortunately, blocking a given country sacrifices legitimate traffic and business opportunities and is actually ineffective in protecting against fraud. Whenever one country is blocked, skilled fraudsters quickly find ways to circumvent such measures by, for example, routing communications through other countries.

However, in accordance with an exemplary embodiment, the system 101 provides for an overview of network activity that allows for correlation of fraudulent activity, even as it changes location and exhibits adaptation to thwart countermeasures. Following a blocking maneuver, the displaced fraudulent traffic may eventually re-appear from another country and may be readily targeted for analysis. In accordance with an exemplary embodiment, the system 101 monitors remote access activity (e.g., dial-up) and can serve as, or be coupled to, a different monitoring system that monitors telephony activity so that correlation may be achieved. This can improve the ability to detect abuse in a timely manner even as locations are changed.

The brute force approach to blocking entire countries also complicates the business arrangements made with some accounts. In some instances, an account holder desires to communicate with a given country despite the service provider's adverse experiences with that country. Often, a waiver must be negotiated such that the service provider makes an exception to policy and the account holder assumes responsibility for such use, including fraudulent abuse if it does occur.

In accordance with an exemplary embodiment of the present invention, so-called "terminal class" information is collected in order to determine what type of call was used to reach the host. For example, it is sometimes noteworthy when a toll-free 800 (or long distance access) number is used to reach a host, and is suspicious when the call from a remote log-on location would normally have been a local call anyway.

In addition to mechanisms for detecting anomalous events, or patterns spanning many events, there is a need to bring suspicious activity patterns to the attention of analysts who can review the circumstances and act upon the information provided by the fraud detection system 101. In particular, it is important to prioritize the information so that fraud activities having the highest potential impact (monetarily or in terms of network security) are brought to the forefront of the analyst's working queue. For this reason, some exemplary embodiments of the present invention provide for comparative multiplier factors derived from statistics gathered for various originating countries and for various partner networks. These multiplier values are applied to a raw severity score derived for each "case." This has the effect of further promoting some cases that relate to historically fraud-ridden sources and which have a higher likelihood of representing fraudulent activity or carry a higher impact of such activity.

Another useful category by which to collect data is the originating telephone number (Automatic Number Identification (ANI) or Calling Line Identification (CLI)). This information can be used to pinpoint the source of attacks even against multiple hosts. Preventive action may then be taken, perhaps immediately during abuse, against perpetrators who would otherwise be difficult to detect and control. In accordance with an embodiment of the present invention, originating ANI information is collected and used so that events, even ones involving different hosts and different systems or accounts, may be correlated. This aspect lends a powerful degree of control over the behavior of a localized source of fraudulent activity—more so than would be possible by examining only events involving a single host.

Detection of fraud in relation to dial-up services may employ a similar processing infrastructure to that used in detecting fraud in a telephony network. One such fraud analysis system is depicted in commonly assigned U.S. Pat. No. 6,208,720 to Curtis et al., which is hereby incorporated by reference in its entirety. However, the parameters that may be monitored and the types of patterns that must be discerned to detect possible fraud are quite different from, and more complex than, those in traditional telephony. The present invention advantageously adapts such an infrastructure to detecting abuses of remote access services.

Yet another aspect that may be monitored in accordance with the present teachings is the number of countries from which originations occur within a given time period, such as a within a 24-hour period. Many accounts will tend to exhibit a low number or at least a fixed number in this regard. Similar to a sudden shift in specific countries, a sudden increase in the number countries may elevate a pattern of activity such that it warrants review by a fraud analyst. It is noted that in accordance with the techniques provided herein and in conjunction with U.S. Pat. No. 6,208,720 to Curtis et al., several "mild" pattern shifts may be correlated to escalate the priority of a given pattern within the attention of fraud analysts.

As dial-up attempts are made, a variety of events are reported to a fraud detection system 101 in accordance with an embodiment of the present invention. Failed attempts have particular significance in the context of dial-up access. Dial-up attempts may fail for a number of reasons. For example, from time to time, a "kill code" associated with a failed attempt will indicate "host not accessible" or "bad connection." These occurrences are generally rare and discounted as being random problems due to congestion or poor telephone connections.

In contrast, a "kill code" specifying "bad user ID or password" may indicate that the attempt was one of many similar failed attempts resulting from someone attempting to hack a dial-up resource. Indeed correlation with other such events and analysis of the particular host, user ID, and password used will help distinguish hacking from innocent causes of isolated failures, such as simple human error or poor connection quality. Another possible kill code relates to a "bad host name." These occurrences are of particular interest because, as mentioned earlier, a hacker may try to guess a host name and a fraud analyst may be able to detect a pattern among attempts. An analyst may be able to predict what host the hacker is targeting.

As explained above, usage patterns can vary from one account to another; what is typical or normal behavior on one account (or domain) may be anomalous and problematic on a different account. Accordingly, the fraud detection system 101 characterizes normal patterns of activity on a per-account basis or at least categorizes accounts into behavior groups, as described in FIGS. 2 and 3. To support fraud monitoring of dial-up services, abusive use of a dial-up connection can be characterized by, but are not limited to, the following attributes: large number of failed log-in attempts, extremely long duration, intercontinental or otherwise costly communications, communications involving certain countries exhibiting high fraud, or large numbers of geographically scattered or simultaneous sessions for a given account. However, such attributes are not dispositve of misuse. Certainly, fraudulent patterns exhibiting one or more of these key characteristics are observed in practice. However, a significant amount of legitimate usage also exhibits one or more of these characteristics, complicating the detection of fraudulent usage. It is thus recognized that a more tailored approach is needed to effectively monitor for fraud in data communication services.

As mentioned, the fraud detection system 101 can map the WAN session information to an event that is analyzed for fraud detection. As will be explained later, the system 101 defines the event, according to one embodiment of the present invention, to be either a billed connection event or a failed authentication event. The system 101 can also derive any additional information or fields required for alarm and case generation, wherein cases are assembled based on rules governing the events. The system 101 further supports provisioning of events to a single billing method. Both single- and multi-event detection algorithms can be utilized by the fraud detection system 101, wherein the use of customized thresholds are permitted as well as consolidation of evidence into cases (consolidation on HostUserId, HostNetwork, and HostCountry). The fraud detection system 101 can receive data files with Host Parameter File (HPF) information (e.g., via Secure SHell (SSH)/Secure CoPy (SCP), File Transfer Protocol (FTP), etc.), if available, and provides via a GUI display of information on the cases. The GUI can additionally display host information (including provisioning and blocking set data) and customer notes for each unique Host Name/Account index.

The fraud detection system 101 utilizes different categories of rules: Normalization/Enhancement, Provisioning, Detection, Case Consolidation, and Prioritization (e.g., alarm level and case level). The system 101 monitors user dial-up "sessions" for users on the WAN 103, which, in an exemplary embodiment, is a packet switched network, such as an IP network or an X.25 network. Two types of events are processed by the system 101: Billed Connections that represent partial or completed user dial-up sessions (both start time and duration are recorded), and Failed Authentications that represent user sessions that were not successfully authenticated. In other words, the fraud detection system 101, according to one embodiment of the present invention, monitors two types of connections: billed connections and failed authentications, and thus receives the corresponding session record types from the WAN 103.

Table 1 summarizes the fields contained in a billed normalized event based on the Billed Connection event. Table 2 summarizes the fields contained in a failed normalized event based on the Failed Authentication event. For purposes of explanation, the normalized event names are "BilledConnect" and "FAuth."

TABLE 1

| NORMALIZED SESSION RECORD FIELD NAMES | DATA FILE FIELD NAME | DEFINITION (Example) |
| --- | --- | --- |
| billingKey1 | BILLING_KEY_1 | Display only. |
| billingKey2 | BILLING_KEY_2 | Display only. |
| sessionLoginTime | ORIG_LOGIN_TS | Time session login occurred. |
| startTime | derived from: ORIG_LOGIN_TS | Login time for the user session. |
| stopTime | derived from: ORIG_LOGIN_TS CONN_DUR | End time of the billing record. |
| duration | CONN_DUR | Current elapsed time in seconds that end user was logged in. |
| priorConnectDuration | PRIOR_CONN_DUR | Elasped time of the user's previously reported connection.. |
| totalConnectDuration | derived from: CONN_DUR PRIOR_CONN_DUR | For long sessions in progress, the total duration added to prior cumulative duration |
| sessionInProgress | Derived from: PRIOR_CONN_DUR | Previously reported elapsed time in seconds that end user was logged in |
| termClass | TERM_CLASS_CD | Code for access method. Display only |
| userNodeName | USER_NODE_NAME | Node name that the user utilized to establish connection. Display only. (FOM) |

TABLE 1-continued

| NORMALIZED SESSION RECORD FIELD NAMES | DATA FILE FIELD NAME | DEFINITION (Example) |
| --- | --- | --- |
| userPortNumber | USER_PORT_NBR | Port number on access node used. Display only. |
| partnerNetwork | GATE_NETWK_ID | Identification of Partner Network. |
| origLocationClass | BILL_CLASS_CD | Code for originating location. Display only. |
| baudRate | BAUD_RATE_CD | Data transmission rate. Display only. |
| destLocationClass | BILL_CLASS_CD2 | Code for destination location. Display only. |
| rateCode | BILL_EVENT_CD | Point-to-point billing surcharge code. Display only. |
| timeZone | TIME_ZONE_CD | Geographical region of end user. |
| host | GROUP_CD | Identification of host that was accessed. |
| CallingAddress | ADDR_STG | Originating network address of the user session. Display only. |
| userId | ENTRY_NETWK_USER_ID | End user who accessed the network. |
| batchId | BATCH_ID | Identifies the unique collection of usage records. Display only. |
| bytesReceived | CHAR_RECV_CNT | Input data volume sent to user. Display only. |
| bytesTransmitted | CHAR_TRANSM_CNT | Input data volume sent from user. Display only. |
| tgaIPAddress | TGA_IP_ADDR_STG | IP Address for Telnet Gateway Application. Display only. |
| tgaSourcePort | TGA_SOURCE_PORT | Display only. |
| tgaDestPort | TGA_DEST_PORT | Display only. |
| userIPAddress | USER_IP_ADDR_STG | IP address assigned by WAN to the end user. Display only. |
| hanId | HAN_ID | Identification of the Host Adjacent Node user was connected to. Display only. |
| freeFlag | FREE_FG | Flag to identify if usage is billable to end user. Display only. |
| cisFlag | CIS_FG | Flag to identify CompuServe Information Customer. Display only. |
| pppFlag | PPP_FG | Flag to identify if point-to-point protocol used. Display only. |
| outboundChargeFlag | OUTBD_RVRS_CHRG | Flag to identify if outbound call was collect or prepaid. Display only. |
| excessUserFlag | EXCESS_USER_FG | Display only. |
| billDate | BILL_DATE | Date data entered collection system. Display only. |
| recordLayout | derived | Original record type. (e.g., Billed_Instance) |
| billingMethod | derived | Network billing type. |
| origCountryCode | To be supplied | Country from where user originated call in ISO format. |
| origCountryName | derived from: origCountryCode | Country name derived from origCountryCode. |
| group | derived | Fraud Detection system group. |
| hostUserId | derived | Key used for alarm generation and case consolidation. |
| hostOrigCountry | derived | Key used for alarm generation and case consolidation. |
| hostPartnerNw | derived | Key used for alarm generation and case consolidation. |

TABLE 2

| NORMALIZED SESSION RECORD FIELD NAMES | DATA FILE FIELD NAME | DEFINITION (EXAMPLE) |
| --- | --- | --- |
| partnerNetwork | GATE_NETWORK_ID | Identification of Partner Network. |
| sourceIPAddress | SOURCE_IP_ADDRESS | IP address of the machine that generated the record. Display only. |
| sessionLoginTime | TIMESTAMP | Time session login attempt occurred. |
| startTime | derived from: TIMESTAMP | Time session login attempt occurred. |
| killCode | KILL_CODE | Code identifying why login was denied. Display only. |
| reasonCode | REASON_CODE | Code identifying why call was denied. Display only. |
| CallingAddress | CALLING_ADDRESS | Network address for the user's session. |
| CalledAddress | CALLED_ADDRESS | Network address user attempted to connect to. |
| gatewayInteractionNo | GATEWAY_INTERACTION_NO | Unique session number assigned by parter network. Display only. |
| host | HOST_NAME | Identification of host that user attempted to access. |
| userId | NETWORK_USER_ID | User ID used for attempted access to network. |
| userNodeName | NODE_NAME | Node name that the user utilized to establish connection. Display only. |
| userPortNumber | PORT_NUMBER | Port number on access node used. Display only. |
| CallId | CALL_ID | Display only. |
| Flags | FLAGS | Display only. |
| transitNwId1 | TNIC_1 | First transit network identifier code. Display only. |
| transitNwId2 | TNIC_2 | Second transit network identifier code. Display only. |
| transitNwId3 | TNIC_3 | Third transit network identifier code. Display only. |
| transitNwId4 | TNIC_4 | Fourth transit network identifier code. Display only. |
| batchId | BATCHID | Identifies the unique collection of usage records. Display only. |
| billDate | BILL_DATE | Date data entered collection system. Display only. |
| tgaIPAddress | TGA_IP_ADDR_STG | IP Address for Telnet Gateway Application. Display only. |
| tgaSourcePort | TGA_SOURCE_PORT | Display only. |
| tgaDestPort | TGA_DEST_PORT | Display only. |
| recordLayout | derived | Original record type. (e.g., Failed_Instance) |
| billingMethod | derived | Network billing type. |
| origCountryCode | To be supplied | Country from where user originated call. |
| origCountryName | derived from: origCountryCode | Country name derived from origCountryCode. |
| group | derived | Fraud detection system group. |
| hostUserId | derived | Key used for alarm generation and case consolidation. |

The fraud detection rules used for alarm generation are shown in the table below. The actual threshold values can be updated through user-maintained alarm tables via the GUI. Table 3 summarizes the exemplary detection rules for generating single-event and multi-event alarms:

TABLE 3

| DETECTION RULE (SHORT NAME) | ALARM TYPE | THRESHOLD SOURCE |
|---|---|---|
| Long Duration (LDur) | Single-event | Default Custom hostUserId Custom host |
| Accumulated Duration - User ID (ADurUser) | Multi-event | Default Custom hostUserId Custom host |
| Accumulated Duration - Country (ADurCtry) | Multi-event | Default Custom hostOrigCountry Custom origCountryName |
| Accumulated Duration - Network (ADurNw) | Multi-event | Default Custom hostPartnerNw Custom partnerNetwork |
| Hot Originating Country (HOC) | Single-event | N/A |
| Hot PSTN (HOA) - e.g., Hot CallerID or Hot ANI | Single-event | N/A |
| Hot IP (HIP) | Single-event | N/A |
| Cold Originating Country (COC) | Single-event | N/A |
| Cold PSTN (COA) - e.g., Cold CallerID or Cold ANI | Single-event | N/A |
| Cold IP (CIP) | Single-event | N/A |
| Failed Authentication (FAuth) | Multi-event | Default Custom hostUserId Custom host |
| Simultaneous Session (SS) | Multi-event | Default Custom hostUserId Custom host |
| Accumulated Duration - Country Terminal Class (ADurCtryTC) | Multi-event | Custom hostOrigCountry/ termClass/serviceType combination |

The fraud detection processes employing these rules are explained with respect to FIGS. 4-10. Such rules result in the generation of various alarms. Table 4 enumerates exemplary alarm level fields.

TABLE 4

| FIELD NAME | ALARM TYPE | DESCRIPTION |
|---|---|---|
| creationTime | All | Contains the Date and Time the Alarm was created |
| duration | LDur ADurUser ADurCtry ADurNw ADurCtryTC | Contains the total duration of the events associated with the alarm. |
| fAuthCount | FAuth | The number of failed authorization events in the alarm. |
| modificationTime | All | Contains the date/time alarm was last updated. |
| name | All | Contains the Alarm violation (LDur, ADurUser). Also known as alert type or evidence type. |
| numEvents | All | Indicates the number of events contained in the alarm. |

TABLE 4-continued

| FIELD NAME | ALARM TYPE | DESCRIPTION |
|---|---|---|
| priority | All | Contains the alarm priority. |
| processingState | All | Indicates the processing state of each evidence (for example, New, Processed, Updated, Excluded) |
| threshold | LDur, ADurUser ADurCtry ADurNw FAuth SS ADurCtryTC | Indicates the threshold value met or exceeded. |
| threshold_source | LDur, ADurUser ADurCtry ADurNw FAuth SS ADurCtryTC | Type of threshold applied (i.e., Custom-HostUserId). |
| host | LDur ADurUser HOC FAuth | Used in alarm exemption. |
| origCountryCode | ADurCtry | Used in alarm exemption. |
| partnerNetwork | ADurNw | Used in alarm exemption. |
| hostUserId | LDur ADurUser HOC FAuth SS | Used for case consolidation. Not displayed with alarm information. |
| hostOrigCountry | LDur ADurCtry HOC ADurCtryTC | Used for case consolidation. Not displayed with alarm information. |
| hostPartnerNw | LDur ADurNw HOC | Used for case consolidation. Not displayed with alarm information. |
| DurThreshold | LDur, ADurUser ADurCtry AdurNw ADurCtryTC | Indicates the duration threshold value met or exceeded. Exported. Not displayed. |
| CountThreshold | ADurUser ADurCtry AdurNw AdurCtryTC SS Fauth | Indicates the count threshold value met or exceeded. Exported. Not displayed. |

The fraud detection system 101 can consolidate the alarms into cases through the use of case-level fields for case filtering, prioritization, and query. That is, the system 101 performs alarm correlation using the concept of a case, which is an encapsulation of related alarms and associated session records into a data set based upon a particular alarm record search-key (i.e., a correlation key field). The case is then given an ID (caseID), which is used throughout subsequent correlation, prioritization, user display, and reporting processes (if applicable).

The cases can be organized by types, for example, based on a host UserID, host country, or host network. The Case Type HostUserId consolidates applicable alarms by the hostUserId field. These cases contain all alarms where a specific userId was used to log into a specific host. The following alarm types are consolidated in the HostUserId cases: LDur, ADurUser, HOC, and FAuth. With regard to the host country, such a case type consolidates alarms by the hostOrigCountry field, whereby these cases contain all alarms where a specific originating country was used for access to a specific host, regardless of the UserId. The following alarm types are consolidated in the HostCountry cases: ADurCtry, and ADurCtryTC.

For presentation, the fraud detection system 101 defines case-level fields made available for presentation (e.g., via Case Summary and Case Detail screens), per Table 5.

TABLE 5

| FIELD NAME | DESCRIPTION |
| --- | --- |
| billingMethods | The network billing types included in the case. |
| caseId | The unique case key value (either a HostUserId, HostCountry, or HostNetwork value). |
| caseType | For example, HostUserId, HostCountry, or HostNetwork |
| creationTime | Indicates the date and time the case was created |
| duration | The sum of the duration of each billed sessions in the case. This field is recalculated each time an alert is updated or added to the case. |
| evidenceTypes | This field contains a list of all unique evidence types in the case. |
| lockedBy | Indicates the user ID that has the case locked. |
| modificationTime | Indicates the Date and Time a Case was last updated. |
| priority | Indicates the score of the case. This field is recalculated each time an alarm is updated, added, or excluded in a case. |
| ruling | Indicates the last ruling made on a case. Valid rulings can be Fraud, Not Fraud, and Pend. The default Ruling is blank. |
| host | The 6-character host name associated with the case. Contained within the caseId. |
| accountNumber | The customer account to which the host belongs. Can be obtained via table lookup using the host as the key. |
| accountName | The customer account name associated with accountNumber. Can be obtained via table lookup using the host as the key. |
| accountIndex | The account index associated with the account. Can be obtained via table lookup using the host as the key. |
| origCountryNames | Indicates the unique originating country names that are contained in the events of the case. |
| origNetworkIds | Indicates the unique partner networks that are contained in the events of the case. |
| status | Indicates the status of the Case: Open or Closed. |
| displayable | Set by implementation: TRUE or FALSE. |

The fraud detection system 101 supports a variety of reporting functions, such as the capability to inquire case information. For instance, case queries can be based on the following case level fields: caseType, evidenceTypes, accountNumber, origCountryNames, origNetworks, caseId, and accountName. In addition: basic queries such as Cases Last Worked By Me, Cases Being Worked, Cases By Ruling queries are supported.

Upon analyzing the cases, the fraud detection system 101 generates case rulings on the respective cases. In an exemplary embodiment, the case rulings include Fraud, Not Fraud, Pending, and Referred. Such rulings (or status information) can be made available to the users. The alarms within a case can be active or inactive (also referred to as excluded alarms). When an alarm is first added to a case, it is active. If a user rules a case as "Fraud" or "Not Fraud," all alarms in the case at that time are changed to inactive (excluded) and remain inactive for the life span of the case. Active alarms contribute to the case priority and are used when calculating various case attributes, such as the total duration of alarms in a case. When the case has a most recent ruling of "Pending" or "Referred," the case is prioritized in the same manner as a case without a ruling, and then can be redisplayed, when a new alarm is added to the case.

The fraud detection system 101 utilizes rules for alarm and case prioritization. Each alarm type can be assigned an initial priority associated with a configurable value. The alarm types can include LDur (Long Duration) alarms, HOC (Hot Originating Country) alarms, ADurUser (Accumulated Duration—User), ADurCty (Accumulated Duration—Country), ADurNw (Accumulated Duration—Network), FAuth (Failed Authentication) alarms, SS (Simultaneous Sessions) alarms, and ADurCtryTC (Accumulated Duration Country Terminal Class). Also, Table 6 lists exemplary case prioritization rules:

TABLE 6

| LEVEL | DESCRIPTION |
| --- | --- |
| CA-1 | The case priority are the sum of the active alarm priorities in the case |
| CA-2 | For each unique partner network in the case that is found in the PartnerNetworkMultiplier table, multiply case score by value found in table |
| CA-3 | For each unique originating country in the case that is found in the OrigCountryMultiplier table, multiply case score by value found in table |

As shown in FIG. 1B, the fraud detection system 101 comprises a number of components, which for the purposes of illustration have labels that are figurative in nature; the functional analogy is that of the "legal" process, where data is fed into the Witness, such as Device 153, 155 and Laws 157, and processed by the analogy processes, which include a Dispatcher 159, Cop/Detective (Single Event and Multi Event) 161, 163, 165, DA Office 167, CC Office 169, 171, and Prosecutor 173, 175, and displayed on the Graphical User Interface (GUI). Notably, the fraud detection system 101 includes the following rules and components: Witness (Device and Rules) 153, 155, 157, Dispatcher 159, Single Event Cop and Single Event Detective 161, Multi Event Cop and Multi Event Detective 165, 167, Assistant District Attorney, District Attorney, Assistant Court Clerk, Court Clerk, Prosecutor, GUI (PC-based), NodeManager/GFSManager, Cleanup Manager, and Tools and Services (Cleanup Manager, CountDumper, Network Management Interface (NMI), Summary LogServer, Count Server, Lock Data Files). The functions of these processes and components are detailed below.

According to an embodiment of the present invention, the Witness Devices 153, 155 and Witness processes 157 have responsibility for data collection and are separate processes for Billed Connection and Failed Authentication events. This approach advantageously ensures that an interface change to one of the record layouts does not impact the Witness Device 153, 155 and Witness rules code for the other record type. Also, this allows each Witness Device 153, 155 to be developed in parallel. The operation of the Witness processes are later described.

The Dispatcher rules are written, for example in C Language Integrated Production System (CLIPS), and perform the following tasks on each event passed to it by the Witness: record dropping (dropping the event if it meets certain criteria), group assignment, event enhancement (transiently), rule set assignment, and cop provisioning and partitioning.

The Single Event Cop (SEC) component is written in CLIPS and creates feature vectors for the following evidence types: Long Duration (LDur), and Hot Originating Country (HOC), Hot PSTN (HOA), and Hot IP (HIP). Hot userIP alert may be issued when the network address (e.g., IP address) of a user is included in a list of Hot IPs. In an exemplary embodiment, entries in the Hot IP list may include wildcards in order to specify a range of addresses. The Hot PSTN type can include parameters relating to features supported by a telephony network; e.g., calling party directory number (Hot callerID). Thus, Hot callerID is synonymous with Hot ANI. A Hot callerID alert is issued when the originating CLI or ANI of a connection is found in a list of hot CLI/ANIs. Customized hostUserId, host, and default thresholds can be applied to the LDur evidence. After comparing feature vector information received from the SEC to the applicable threshold, a Single Event Detective creates the evidence, when appropriate, and assigns the base priority for each evidence type.

Alternatively, the addition to or in lieu of "Hot" attributes, "Cold" attributes could be utilized, whereby a single event trigger is based on specifying an authorized or legitimate attribute. For example, a Cold IP indicates only IP addresses that are authorized (as opposed to those that are unauthorized in the case of a Hot IP).

The Multi Event Cop, in an exemplary embodiment, creates feature vectors for the following evidence types: Accumulated Duration—User Id (ADurUser), Accumulated Duration—Country (ADurCtry), Accumulated Duration—Network (ADurNw), and Failed Authentication (FAuth). Customized and default thresholds can be applied to each of these evidence type; such thresholds can be enforced through the GUI. After comparing feature vector information received from the MEC to the applicable threshold, a Multi Event Detective creates the evidence, when appropriate, and assigns the base priority for the evidence type.

The Assistant District Attorney (AsstDA) enhances events and evidence persistently and can adjust the evidence priorities based upon the rules. The District Attorney (DA) adds the evidence to a case. The Assistant Court Clerk (AsstCC) enhances the case by creating the case level fields that are needed by the Court Clerk for case prioritization, based upon the appropriate rules. The Court Clerk (CC) adjusts the case priority based upon the rules.

The GUI displays cases to the user/analyst so that appropriate fraud monitoring and response can be performed. By way of example, in a standard Microsoft Windows format (based upon Visual Basic), or web-based, the GUI provides the user with a Case Summary Screen, with a list of cases arranged in the highest priority order, and a Case Detail Screen providing the details of an individual case. In addition, the GUI supplies a Table Editors screen for allowing privileged users to change thresholds, reference values, etc., as well as an Account Editors screen for adding, deleting, and modifying user accounts. Further, a Customer Notes screen is supported by the GUI to allow users with the capability to add, delete, and modify notes pertaining to individual customer accounts, and to display specific host information (this information can be persistent; not stored with a specific case).

A script imports HPF (host) data into a database table for use by the GUI. Case, alarm, and event data are viewed by fraud monitoring agents through a workstation GUI. Reporting data can be exported to flat files for future use in a reporting database.

Per FIG. 1B, the WAN 103 stores information relevant to the detection of fraudulent usage of data communication services within the databases 105, 107, which for the purposes of explanation, is denoted as a single WAN database 151. The billed and failed events are supplied to respective Witness devices 153, 155. The Witness devices 153, 155 forward the received data files to the appropriate Witnesses 157. With the ability of the fraud detection system 101 to launch more than one instance of a Witness 157, each Witness 157 is configurable as to which files it will process. Several instances of the Witness 157 can execute simultaneously.

The Witness 157 can be configured to process certain directory files so that each Witness processes 157 its assigned data without contending with other instances for the same data. According to one embodiment of the present invention, two Witnesses 157 (and associated Witness Devices 153, 155) are utilized: one to process the BilledConnect data files, and one to process the FAuth data files, corresponding respectively to the Billed Connections and Failed Authentications events. The two Witness instances ("BILLED_Instance" and "FAILED_Instance") 153, 155 perform file processing, filtering, and normalized event generation. For each Witness, the following Witness sub-components can be developed: Witness Preprocessor, Witness Device 153, 155, and Witness 157. The Witness Preprocessor ensures the proper transfer and storage of the data files for processing. The Witness Device 153, 155 handles the parsing out of individual event records within the .dat files, converts them to the correct data types, and writes them to a buffer for the Witness 157 to process. The Witness 157 handles the normalization of data records into normalized events recognized by the fraud detection system 101.

The details of the processing of the Billed Connections and Failed Authentications events are described in terms of the input and output data. By the end of the Witness rules processing, the data will have been placed into the events database in the normalized "BilledConnect" and "FAuth" events.

In interface agreements with the WAN group, as mentioned, the .dat files containing the BilledConnect and FAuth records are sent, for example, via file transfer by the WAN group into a "/Data/BilledConnect" directory on the fraud detection system server (not shown); therefore, it will not be necessary to write a Witness Preprocessor. When transferring files to the fraud detection system server, the WAN group can be requested to ensure the correct filenames are used, and that files are completely transferred before the correct filenames are used (to keep the Witness Device from trying to process an incomplete file).

Each Witness Device 153, 155 first starts processing the data (.dat) files that are collected by the fraud detection system 101 and stored in the predetermined directory (/Data). The following steps are taken once a file has been selected to process (although not necessarily in this order). The file name is changed so that other instance of a Witness Device does not attempt to process the file. The Witness Device parses the file into individual event records, and applies a filter to drop invalid entries (for example, not enough fields or record does not match the format). For instance, the Witness Device, for BilledConnect, drop records where host (GROUP_CD) is blank. For FAuth, records where host (HOST_NAME) is blank are dropped. Additionally, the Witness Device creates a message packet with header (record count, layout), as well as the appropriate records, sending them to the appropriate Witness process (read into buffer). The processed filed is then moved to a different part of the directory; e.g., "processed" or "invalid" directory. Thereafter, counters are updated for reporting purposes. As noted, periodic polling is performed to check whether there are more files to process.

The BILLED_InstanceFileWitDevice 153 then puts all of the data into a buffer that is sent to the corresponding Witness. The format of the data is shown above. Likewise, the FAILED_InstanceFileWitDevice 155 sends the buffered data to the appropriate Witness process. Each message packet sent to the Witness contains a header record with the following information (per Table 7, below):

TABLE 7

| MESSAGE FIELD | DESCRIPTION |
| --- | --- |
| numRecords | Number of records |
| layout | Record layout = BILLED_Instance (or FAILED_Instance) |

The Witness Rules handle the data received from the BILLED_InstanceFileWitDevice 153 and FAILED_InstanceFileWitDevice 155, and the normalization of the records into BilledConnect and FAuth events, respectively. In one embodiment of the present invention, the rules for identifying the input Witness Device 153, 155, the block header information for the buffer, and reading in the session records (both billed and failed) are stored in a file (e.g., dasFileHeader.rules file).

The functionality of the Dispatcher 159 includes the derivation of specific fields, suppression, assigning of the group and rule set, partitioning and provisioning to the cop(s), and setting the origination time. Dispatcher files can be shared with the AsstDA, and thus, are prefixed with "EventCommon." Build rules can be used to create the Provisioning rules (assigning events to the appropriate rule sets) and Partitioning rules (setting the correct partition) based on the event type—for example, Built-SetBilledConnectRuleSetBilledConnection and Built-SetBilledConnectPartition.

Table 8 lists derived fields that derived from the BILLED_Instance and/or FAILED_Instance events either for further processing in the Dispatcher 159 or use by other components:

TABLE 8

| FIELD | DERIVED FROM |
| --- | --- |
| startTime | both BILLED_Instance and FAILED_Instance events |
| stopTime | BILLED_Instance events only |
| sessionInProgress | BILLED_Instance events only |
| billingMethod | both BILLED_Instance and FAILED_Instance events |
| hostUserId | both BILLED_Instance and FAILED_Instance events |
| hostOrigCountry | BILLED_Instance events only |
| hostPartnerNw | BILLED_Instance events only |
| totalConnectDuration | BILLED_Instance events only |
| origCountryName | both BILLED_Instance and FAILED_Instance events |

The above fields, in an exemplary embodiment, are set using a SetFieldsEvent UDF (User Defined Function). To efficiently set these fields, and provide for greater "configurability" for future enhancements, the following CLIPS techniques can be used. Namely, the existence of facts causes rules to fire, instead of salience. Also, deffacts and build rules are used when possible to specify what event fields are set and how. Further, Tables and Set lookups are used instead of "hardcoding" translations of numeric codes to textual descriptions (for example, the origCountryName translation).

Because the date and time of a call is received as strings, instead of number of seconds since an epoch, the startTime needs to be calculated in the Dispatcher 159. The UDF for CreateDateTime accepts a date/time in the format "YYYY MM DD HH:MM:SS". The Dispatcher laws convert the sessionLoginTime format (MM/DD/YY hh:mm) to startTime, which is in the format required by CreateDateTime. CreateDateTime is passed the date/time string and the timeZone (which is GMT).

The stopTime is derived in the Dispatcher 159 by taking the startTime and adding the seconds in the duration field using the AddDate UDF. This field can be used to set Origination Time required by the Infrastructure for measurements and old event delta processing.

The sessinInProgress field is a flag field that represents whether the event is a long session in progress (long sessions are billed through multiple session records that will not be matched). If the priorConnectDuration is greater than 0, the Dispatcher 159 will set sessionInProgress to TRUE, otherwise FALSE.

The billingMethod provides a mechanism to associate events to the service provider network. This field can be used for threshold determination.

The hostUserId field can be set in the Dispatcher 159 by concatenating (str-cat) the host with userId, separated by a colon (:); for example HOSTNAME:johndoe. Similarly, the hostOrigCountry field can be set in the Dispatcher 159 by concatenating (str-cat) the host with origCountryName, separated by a colon (:); for example, HOSTNAME:Japan. This concatentating scheme also applies to the hostOrigNw field, whereby the host with partnerNetwork are separated by a colon; e.g., HOSTNAME:142.

The totalConnectDuration field is set by adding the duration field (in seconds) to the priorConnectDuration field (also, in seconds). The origCountryName is set by performing a table lookup using the CountryCodeTable with the origCountryCode used as the key. This lookup can be performed by the Dispatcher 159, instead of the GUI because a given country has multiple country codes and the users would like these multiple country codes mapped to a unique country prior to alert generation and case consolidation.

Using the SetRuleSet UDF, the event is assigned (provisioned to) one of the rule sets listed in Table 9 below.

TABLE 9

| RULESET | COP TYPE | DETECTION ALGORITHMS | CONSTRAINTS |
| --- | --- | --- | --- |
| DefaultBilledConnection | SEC | LDur HotOrig | All BILLED_Instance events can be assigned to this rule set. |
| | MEC | ADurUser ADurCtry ADurNw | |
| DefaultFAuthentication | MEC | FAuth | All FAILED_Instance events can be assigned to this rule set. |

The processing of events can be partitioned among multiple components based on key values in the events. Because the SEC involves single events (unlike the MEC), events can be round-robinned between as many SEC processes as necessary. This results in the following partitioning of an event: (1) SEC-BILLED_Instance events (DefaultBilledConnection ruleset) are partitioned to DispatcherEventsSEC1; and (2) MEC-BILLED_Instance events (DefaultBilledConection ruleset) are partitioned to DispatcherEventsMEC_Billed_0 (through 9). For instance, FAILED_Instance events (DefaultFAuthentication ruleset) are partitioned to DispatcherEventsMEC_Failed_0 (through 9).

Rules can be built to call the SetPartition UDF based on deffacts that define the RuleSet and its partitions. These deffacts can be used to build rules upon start up, thus allowing for the addition of new RuleSets and Partitions on the fly. Also, in the case that multiple MECs are needed in the future, a function can be written that takes the last two digits of the key and returns an appropriate partition. Thus, if for performance reasons multiple MEC cops need to be created, the possible partitions (and publish titles) can be configured so that each MEC gets certain events. This permits ease of adding more MECs without having to change any CLIPS code. If the key is alpha-numeric, it can be necessary to convert an alpha-numeric character to a 0-9 numeric value.

For events with a recordType of BILLED_Instance, using the SetOriginationTime UDF, the origination time of the event can be set to stopTime. For events with a recordType of FAILED_Instance, using the SetOriginationTime UDF, the origination time of the event can be set to startTime.

The Single Event Cop (SEC) performs the following functions: subscribes to the normalized events published by the Dispatcher 159, creates one or more features based on the events received (based on feature vector properties), adds the features to a feature vector, and publishes the feature vector to the Single Event Detective (SED). If the rules for creating a feature vector are met (based on event type and rule set), the SEC rules will assert a control fact (FeatureVectorInfo). In an exemplary embodiment, one rule can be used for checking the Long Duration threshold, and another rule for checking if a Hot Originating Country exists. If this control fact is asserted, the CreateFeatureVectorRule creates the appropriate feature vector based on facts that specify which fields to add to the feature vector.

The creation of the feature vector is accomplished using the CreateFeatureVector UDF. Each evidence type uses its own feature vector, e.g., LDur_FV and HOC_FV. To be able to generate evidence, the total session duration (totalSessionDuration) can be compared against a Long Duration threshold determined in the SEC as follows. First, there can be a lookup using the LookupTableFeature UDF in the LDThresholds table with the hostUserId. If the hostUserId is found in the table, "customHostUID" can be placed in the thresholdSource field. If no customized hostUserId is found, the LDThresholds table is then checked using the host. If the host is found in the table, "customHost" can be placed in the thresholdSource field. If no customized host is found, the LDThresholds table is then checked using the Default key, and "Default" is populated in the thresholdSource field.

The following event features (FVProperties) are set in the feature vector: duration, host, hostOrigCountry, hostPartnerNw, hostUserId, threshold, and thresholdSource.

The origCountryCode can be compared to a predefined list of country codes to determine if it is "hot." The HotOrigCountries set is used, via the ExistsInSetFeature UDF, to determine if the origCountry is in the set. If the origCountyCode is not set, then the HOC lookup will not be performed. The following event features (FVProperties) are set in the feature vector: hostOrigCountry, hostPartnerNw, and hostUserId.

As noted, templates can be utilized for the SEC rules.

The Multiple Event Cop (MEC) subscribes to the normalized events published by the Dispatcher 159, creates the necessary features, creates feature vectors, and publishes the feature vectors to the MED. According to one embodiment of the present invention, summation rules can be created for the Billed MEC evidence types, and simple count rules can be created for the Failed MEC evidence type. The rules DefineSummationFeatureRule and DefineSimpleCountRule define all features that are summation based or simple count based, respectively. The MEC design utilizes the (Key {keyName}) fact that is available through the Infrastructure. This fact specifies the key for which the event is partitioned. For example, the facts (Key HostCountry) (Key HostUserId) and (Key HostNetwork) can be asserted to determine which feature vector types can be created for a given event. If the rules for a particular MEC contain rules which take measurements for multiple keys, then the Key fact should be included in the LHS of the rule so that only those events which were partitioned to the particular MEC can be run.

From the BILLED_Instance or FAILED_Instance fact, a feature vector is created that contains the appropriate information for the Multi Event Detective. This information is supplied to the Detective for possible generation of one of the MEC alarms. The creation of the feature vector is accomplished using the CreateFeatureVector UDF. Each evidence type uses its own feature vector: ADurUser: ADurUser_FV; ADurCtry: ADurCtry_FV; ADurNw: ADurNw_FV; and FAuth: FAuth_FV. The following features are set in the feature vector: host, hostUserId, duration, threshold, and thresholdSource.

The ADurUser alert can be based on the total accumulated duration with the same hostUserId. This accumulated duration can be compared against a threshold that can be determined as follows. First, there can be a lookup using the LookupTableFeature UDF in the ADurUserThresholds table with the hostUserId. If the hostUserId is found in the table, "customHostUID" can be placed in the thresholdSource field. If no customized hostUserId is found, the ADurUserThresholds table is then checked using the host. If the host is found in the table, "customHost" can be placed in the thresholdSource field. If no customized userId is found, the ADurUserThresholds table is then checked using the Default key, and "Default" is populated in the thresholdSource field.

If a threshold is found, then a feature vector is defined based on the type of key. After a feature vector is created, the billed session event duration can be summed within the measurement by calling the CalcSummationFeature UDF. The ADurUser alert will only have one measurement window that can be defined using facts that map the feature to the interval and anchor time. That is, the creation of the feature vector is accomplished using the CreateFeatureVector UDF, the measurement counter is created using the DefineSummationFeature UDF, and the counter is updated using the CalcSummationFeature UDF.

The ADurCtry alert can be based on the total accumulated duration with the same hostOrigCountry. This accumulated duration can be compared against a threshold that can be determined as follows. First, there can be a lookup using the LookupTableFeature UDF in the ADurCtryThresholds table with the hostOrigCountry. If the hostOrigCountry is found in the table, "customHostCtry" can be placed in the thresholdSource field. If no customized hostOrigCountry is found, the ADurUserThresholds table is then checked using the origCountry. If the origCountry is found in the table, "customOrigCtry" can be placed in the thresholdSource field. If no customized origCountry is found, the ADurCtryThresholds table is then checked using the Default key, and "Default" is populated in the thresholdSource field.

If a threshold is found, then a feature vector is defined based on the type of key. After a feature vector is created, the billed session event duration can be summed within the measurement by calling the CalcSummationFeature UDF. The ADurCtry alert will only have one measurement window that can be define using facts that map the feature to the interval and anchor time. The following features are also set in the feature vector: HostOrigCtry, origCountryCode, threshold, thresholdSource, and duration.

The ADurNw alert can be based on the total accumulated duration with the same hostPartnerNw. This accumulated duration can be compared against a threshold that can be determined as follows. First, there can be a lookup using the LookupTableFeature UDF in the ADurNwThresholds table with the hostPartnerNw. If the hostPartnerNw is found in the table, "customHostNW" can be placed in the thresholdSource field. If no customized hostPartnerNw is found, the ADurNwThresholds table is then checked using the partnerNetwork. If the partnerNetwork is found in the table, "customNW" can be placed in the thresholdSource field. If no customized partnerNetwork is found, the ADurNwThresholds table is then checked using the Default key, and "Default" is populated in the thresholdSource field.

As with the ADurCtry alert, if a threshold is found, then a feature vector is defined based on the type of key. The following features are set in the feature vector: HostPartnerNw, partnerNetwork, threshold, thresholdSource, and duration. After a feature vector is created, the billed session event duration can be summed within the measurement by calling the CalcSummationFeature UDF. The ADurUser alert will only have one measurement window that can be define using facts that map the feature to the interval and anchor time. The creation of the feature vector is accomplished using the CreateFeatureVector UDF, the measurement counter is created using the DefineSummationFeature UDF, and the counter is updated using the CalcSummationFeature UDF.

The FAuth alert can be based on the total number of failed authorizations with the same hostUserId. This count can be compared against a threshold that can be determined as follows. First, there can be a lookup using the LookupTableFeature UDF in the FAuthThresholds table with the hostUserId. If the hostUserId is found in the table, "customHostUID" can be placed in the thresholdSource field. If no customized hostUserId is found, the FAuthThresholds table is then checked using the host. If the host is found in the table, "customHost" can be placed in the thresholdSource field. If no customized host is found, the FAuthThresholds table is then checked using the Default key, and "Default" is populated in the thresholdSource field.

If a threshold is found, then a feature vector is defined based on the type of key. The following features are set in the feature vector: hostUserId, host, threshold, thresholdSource, and fAuthCount. After a feature vector is created, the failed session event can be counted within the measurement by calling the CalcSimpleCountFeature UDF. The ADurUser alert has one measurement window that can be define using facts that map the feature to the interval and anchor time. The creation of the feature vector is accomplished using the CreateFeatureVector UDF, the measurement counter is created using the DefineSimpleCountFeature UDF, and the counter is updated using the CalcSimpleCountFeature UDF.

The Single Event Detective (SED) subscribes to the feature vectors published by the SEC, creates evidence based on the feature vectors received and the defined detection criteria (BuildRuleEvidenceFacts), and publishes evidence to the DA Office 167. According to an embodiment of the present invention, the single-event evidence types include LDur and HOC. Each of these evidence types apply to BilledConnect event only. Build rules BuildThresholdEvidenceRules and BuildExistsEvidenceRules can be used to create rules for evidence that are threshold-based (LDur) and for evidence that is based on whether a feature vector exists (HOC). The EvidenceProperty Facts will then be used to specify the fields that should be added to the evidence.

The following discussion address the evidence that can be created based upon the feature vector(s) generated by the Single Event Cop. From the feature vector(s) created by the Single Event Cop, comparisons and value checks are made to determine if evidence should be generated. If certain criteria are met, the UDF CreateEvidence is called, resulting in a transient piece of evidence, along with a pointer to the generating event, being created.

The criteria for generating evidence is now described. There is no hierarchy associated with the evidence creation, and an event (feature vector) can generate none or all of the evidence types in its ruleset. When CreateEvidence is called, the appropriate evidence name is given, along with the priority that is read from the configuration file, and the appropriate partition. Fields are set in the evidence through either the CopyFieldEvidence UDF or the SetFieldEvidence UDF. Build rules can be used to create the evidence in the SED. There can be corresponding facts that contain each unique evidence type and the constraint method that is used to check if the evidence should be created.

If there is an LDur_FV feature vector, and the duration is greater than or equal to the threshold, then LDur evidence is created with the UDF CreateEvidence. The LDur evidence contains the following fields: hostUserId (used for case consolidation), hostOrigCountry (used for case consolidation), hostPartnerNw (used for case consolidation), host, duration (totalSessionDuration), threshold, and thresholdSource. Also, if there is an HOC_FV feature vector, then HOC evidence is created with the UDF CreateEvidence, with the following fields: hostUserId (used for case consolidation), hostOrigCountry (used for case consolidation), and hostPartnerNw (used for case consolidation). The initial base priority for each evidence type can be set in the SED through either a table lookup or configuration file entry.

As regard the Multiple Event Detective (MED), a build rule (BuildThresholdEvidenceRules) creates a rule for the creation of each of the evidence types; for example, the rule Built-LDurEvidence can be created. These built rules can be fact-driven and will create evidence whenever a threshold is met or broken. The appropriate fields can be copied to the evidence from the feature vector.

From the feature vectors created by the Multi Event Cop, comparisons and value checks are made to determine whether evidence should be generated. If certain criteria are met, the UDF CreateEvidence is called, resulting in a transient piece of evidence, along with a collection of pointers to the generating events, being created. The following sections describe the criteria for generating evidence. As with the SED, no hierarchy is associated with the evidence creation, whereby an event (feature vector) can generate none or all of the evidence types in its ruleset. When CreateEvidence is called, the appropriate evidence name is given, along with the priority that is read from the InitalAlertPriority table, and the appropriate partition. Fields are set in the evidence through either the CopyFieldEvidence UDF or the SetFieldEvidence UDF.

If there is an ADurUser_FV feature vector, and the accumulated duration is greater than or equal to the threshold, then ADurUser evidence is created with the UDF CreateEvidence. The ADurUser evidence contains the following implementation fields: hostUserId, host, duration (the total duration of all of the events), threshold, and thresholdSource. The MED can set the initial base priority for each evidence type through either a table lookup or configuration file entry.

If there is an ADurCtry_FV feature vector, and the accumulated duration is greater than or equal to the threshold, then ADurCtry evidence is created with the UDF CreateEvidence. The ADurCtry evidence can include the following fields: hostOrigCountry (used for case consolidation), origCountryCode, duration (the total duration of all of the events), threshold, and thresholdSource.

Additionally, if there is an ADurNw_FV feature vector, and the accumulated duration is greater than or equal to the threshold, then ADurNw evidence is created with the UDF CreateEvidence, wherein the ADurNw evidence specifies the following fields: hostPartnerNw (used for case consolidation), partnerNetwork, duration (the total duration of all of the events), threshold, and thresholdSource.

For the Failed Authentications (FAuth) event, if there is an FAuth_FV feature vector, and the number of failed authorizations is greater than or equal to the threshold, then FAuth evidence is created with the UDF CreateEvidence. The FAuth evidence includes the following fields: hostUserId (used for case consolidation), host, fAuthcount, threshold, and thresholdSource.

Assistant District Attorney (AsstDA) functions include enhancing events, asserting enhanced events, and enhancing evidence. Event enhancement rules (EventEnhancement) are developed for the Dispatcher 159 and shared with the AsstDA. The same functions and rules that are used in the Dispatcher 159 to set these derived fields are also used by the AsstDA. Thus, the fields (as shown in Table 9) can be persistently added to an event. It is noted that SetOriginationTime UDF cannot be called from the AsstDA component, and therefore cannot be placed in a file shared by the Dispatcher 159 and AsstDA. A file, EventCommonRules can be created for rules shared by the Dispatcher 159 and AsstDA.

The District Attorney (DA) is responsible for adding evidence to the three DAS case types with the AddEvidenceToCase UDF. Adding evidence either results in a new case being generated, or an existing case being updated. Using a generic build rule, rules are built at run-time for each of the different evidence types and their corresponding case types. For example, a Built-AddLDurToHostUserId rule can be created. Based upon the existence of an evidence fact, a call to AddEvidenceToCase is made. Because the DA is in the DA Office 167, it picks up all of the same rules files (in this case, templates) that the AsstDA is using.

The DAS Assistant Court Clerk (AsstCC) receives case collections from the DA Office 167 and enhances the cases with additional case fields. The case-level fields that can be enhanced in the AsstCC are described below. Each case field can be enhanced through a build rule, based on the specific case type, and record type, if necessary. For example, a ValidCaseType fact can be used in a single build rule to create: Built-EnhanceHostUserIdBillingMethod, Built-EnhanceHostCountryBillingMethod, and Built-EnhanceHostNetworkBillingMethod. Several of the case fields below are "list" fields: billingMethods, evidenceTypes, origCountryNames, and origNetworkIds. For these fields, a rule can be written that adds a value to the list if is not already on the list (such as, ObtainUnique[fieldName]TypeList). Once the unique list values are obtained, the SetCaseFields UDF can be called.

By way of example, enhancements with respect to each of three DAS case types (HostUserId, HostCountry, and HostNetwork) are explained. The following fields can be added to each case: duration, evidentTypes, accountNumber, accountName, billingMethods, origCountryNames, and origNetworkIds. The duration field of the case is set to the sum of the durations of all of the case events (using the UDF SumEventField). This is the duration field in the event, not the totalSessionDuration. The evidenceTypes field of the case contains a list of all the unique evidence types that are in the case. The accountNumber field of the case contains an account number obtained by a table lookup from the HostTable using the host field in any event as the key. The accountName field of the case contains an account name obtained by a table lookup from the Host Table using the host field in any event as the key. The billingMethods field of the case contains a list of all the unique billing methods that are in the events in the case. The origCountrieNames field of the case contains a list of all the unique originating countries (origCountryName) that are contained in the case events. The origNetworkIds field of the case contains a list of all the unique partner networks (partnerNetwork) that are contained in the case events. Networks IDs will remain numeric in this case field. (Network IDs can be translated to network names in the GUI).

If a Fraud or Not Fraud ruling is made, the case level fields, duration, evidenceTypes, billingMethods, origCountryNames, and origNetworkIds, can be reset (for all case types).

The Court Clerk (CC) is responsible for performing the final case score adjustments. This is accomplished using the SetCasePriority and MultiplyCasePriority UDFs. Because the Court Clerk is in the CC Office 169, 171, it picks up all of the same rules files (including the templates) that the AsstCC is using. A build rule can be utilized that builds each of the case multiply rules (CA-2 and CA-3), for each of the three case types (HostUserId, HostCountry, and HostNetwork). For example, a specific built rule can be Built-HostUserIdCA-2. A fact can be used to match the prioritization rule to the corresponding case-level field and lookup table. For the CA-1 multiply rule, the base case score is created by summing the individual alert scores. This can be accomplished in the DA Office 167. With CA-2, the customer is interested in prioritizing cases according to what networks the sessions originate from. The CC will adjust the case score by looking up each partnerNetwork from the origNetworkIds field in the PartnerNetworkMultiplier table, checking for a valid multiplier value, and then multiplying the case score by the returned value (MultiplyCasePriority UDF). The CA-3 rule involves prioritizing cases according to what countries the sessions originate from. The CC accordingly adjusts the case score by looking up each origCountryName from the origCountryNames field in the OrigCountryMultiplier table, checking for a valid multiplier value, and then multiplying the case score by the returned value (MultiplyCasePriority UDF).

As earlier described, the Graphical User Interface (GUI) has responsibility for displaying the cases, evidence, events, and customer information to the user. In addition, the GUI allow users to perform maintenance of user accounts, system tables, and customer information. Further, the GUI can support the following functions: Tool bar—the current buttons on the Case Summary and Case Detail can be replaced with icons on a toolbar, and Table Maintenance. The fraud detection system 101 can also utilize icons for the following screens: My Profile, User Account Maintenance, Table Maintenance, Threshold Editing, Account Information, and Quick Reference Tables.

Figure 2:
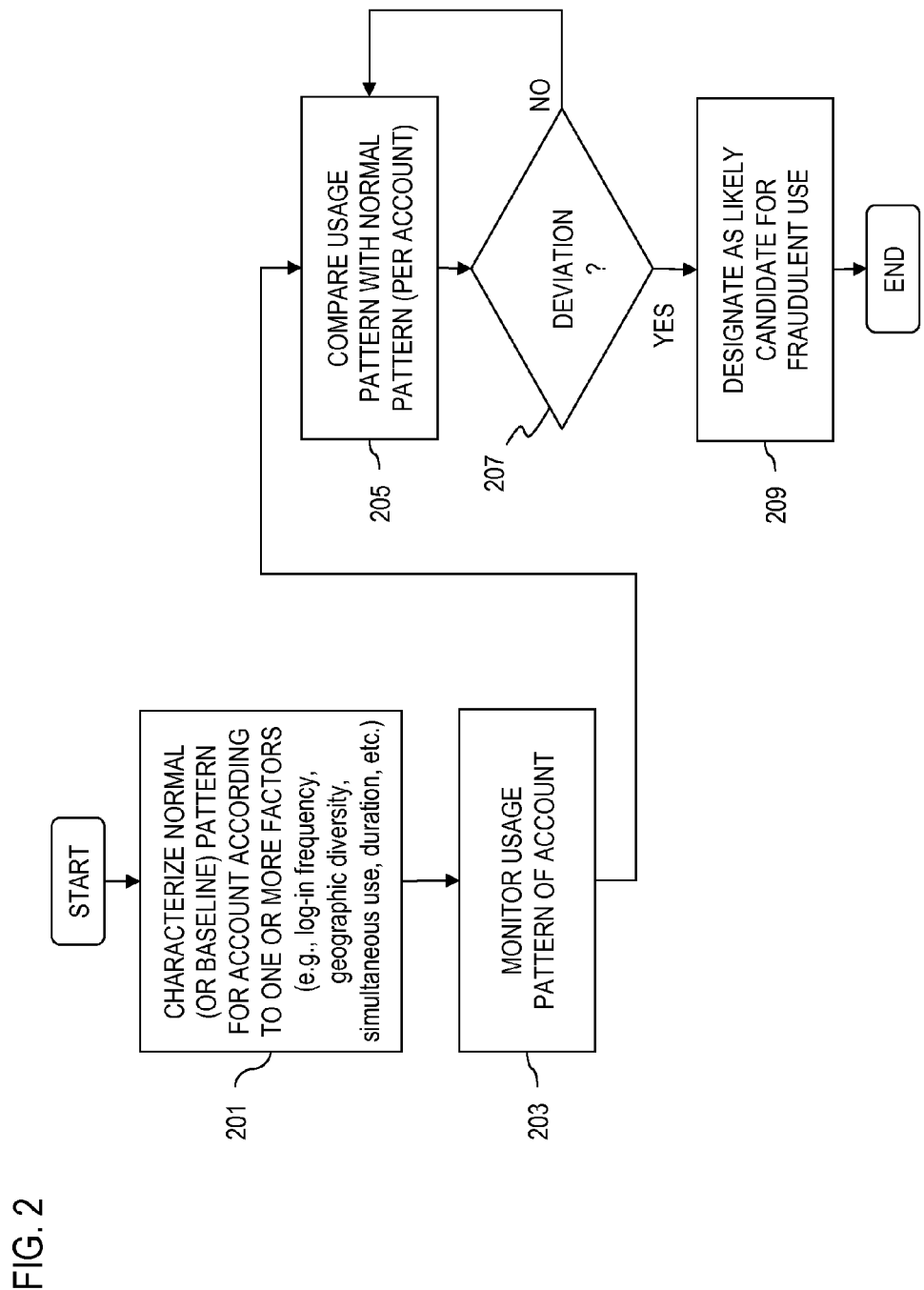
FIG. 2 is a flowchart of a fraud detection process utilizing a baseline usage pattern for determining fraudulent use, according to an embodiment of the present invention.

FIG. 2 is a flowchart of a fraud detection process utilizing a baseline usage pattern for determining fraudulent use, according to an embodiment of the present invention. In step 201, a baseline (or "normal") usage pattern is established, for example, by analyzing historical data for a particular account with respect to one or more factors, such as log-in frequency, geographic diversity, simultaneity of use, and duration of use. The fraud detection system 101, per the monitor devices, can monitor the actual usage pattern of the particular account under scrutiny, per step 203. Next, the fraud detection system 101 compares the usage pattern with the established baseline usage pattern to determine whether there is a significant deviation either in view of the totality factors used to establish the patterns, or one or more factors that exceed predetermined thresholds to indicate a high likelihood of fraudulent use by the account (steps 205 and 207). This probability can be based on the number of failed attempts. These factors and associated thresholding are detailed below in FIGS. 4-9. If the system determines that a deviation exists, then the account is designated as a likely candidate for fraud, as in step 209.

It is possible for activity on an account to shift from a first pattern to second pattern. The first pattern may represent legitimate use, whereas the second pattern, though commonly observed as valid use among other accounts, may represent a departure indicative of fraud.

It is desirable to determine the extent to which user IDs may be shared and to look for violations involving sharing when there should be none. Some accounts may have a large number of user IDs—enough so that each user ID need not be shared among multiple users. If the understanding with the users in this name space is that user IDs are not to be shared, then it is desirable to detect incidences of sharing as this may be indicative of misappropriation of user IDs and passwords or of other misbehavior related to fraudulent usage. Aberrant usage may be detected by determining by overlap in session times, login from a multiplicity of geographically diverse locations, and more than 24 hours of use in a given day (or more than 60 minutes of use in a given hour or real time, etc.).

One mechanism of detection relates to reasonable speeds of physical travel and offers a more sophisticated detection than simultaneous use. For example, a log-in from the United States followed by a log-in from Australia less than thirty minutes later implies use by more than one person because it is presently impossible for the legitimate user to travel that distance along the surface of the earth within the half-hour time frame. Sufficiently frequent collection and analysis of activity can provide timely detection of such behavior. It may even be possible to take immediate action to interrupt communications or otherwise intervene when abuse can be verified while it is occurring.

Some accounts, especially those having relatively few user IDs, may allow sharing. Nevertheless, the frequency, duration, and other patterns of use may be useful to monitor for abuse.

Another aspect of accounts relates to geographical distribution. One account, such as a work-at-home network connection, may be very monotonous in consistently establishing communications between two particular points. An enterprise account may have installations worldwide and may frequently establish communications among specific countries and continents. The consistency of the communications in being from a particular set of countries may also vary. A global manufacturer may often communicate among a dozen countries but rarely communicate outside of this set. A sudden flux of communications involving other countries could represent fraud or it could represent normal employee travel or company expansion. Upon detection, it is relatively easy to check with the account and determine whether the shift in activity can be accounted for. It cannot be assumed for all accounts, that such a pattern is or is not a fraudulent pattern without considering the behavior and business needs of the particular account.

For example, it is common for a news agency to dispatch reporters to cover stories in various parts of the world. Reporters uploading data, recorded media and reports will often log-in from locations that are new with respect to the account and conduct prolonged sessions. It is worth noting how this same pattern might be clearly indicative of possible fraud in the context of other account types.

Figure 3:
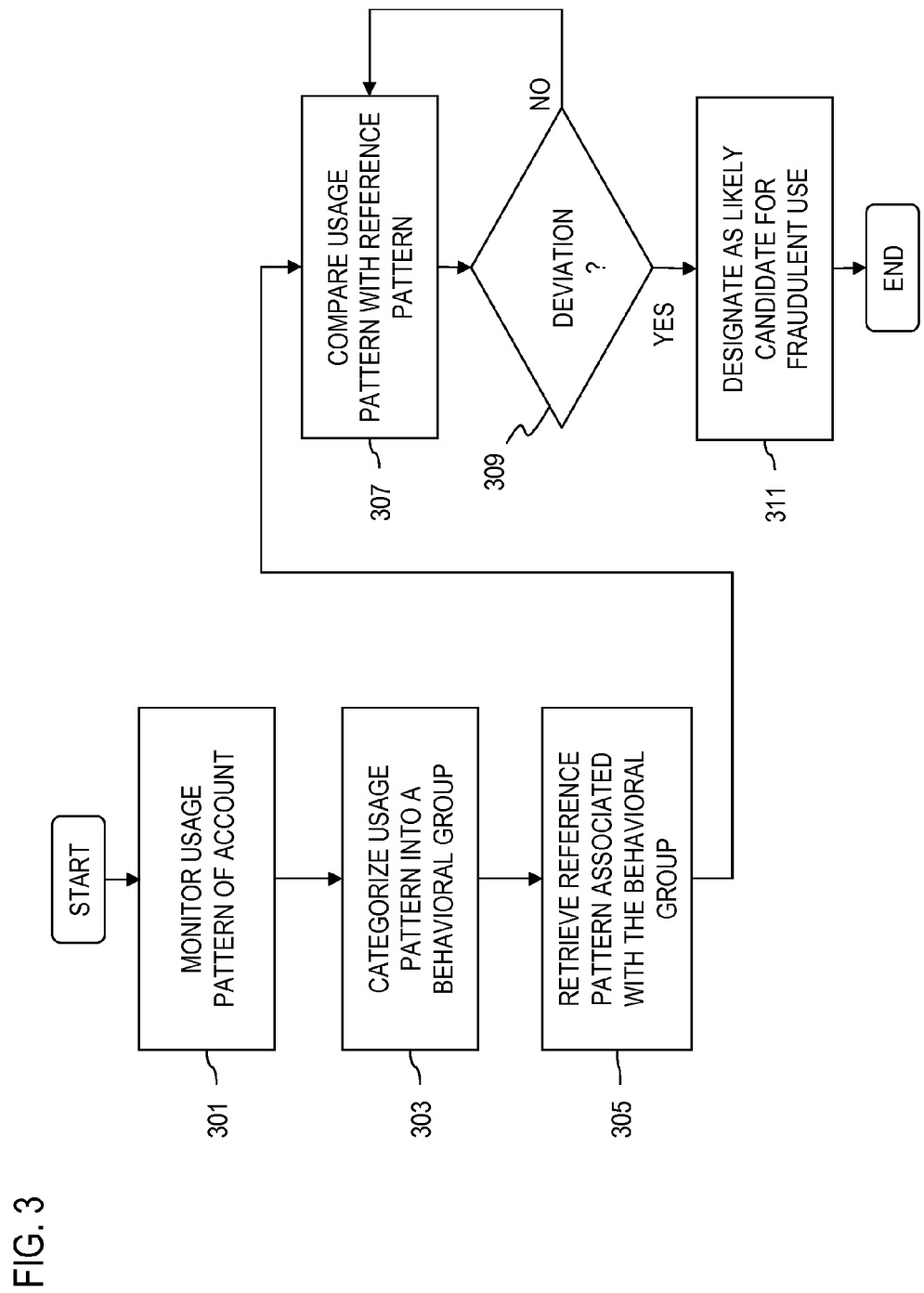
FIG. 3 is a flowchart of a fraud detection process involving categorization of usage patterns into behavioral groups, according to an embodiment of the present invention.

FIG. 3 is a flowchart of a fraud detection process involving categorization of usage patterns into behavioral groups, according to an embodiment of the present invention. In an alternative embodiment, the fraud detection system 101 provides for monitoring of the usage pattern, per step 301, and then categorizing such determined usage pattern into a behavioral group among multiple predetermined behavioral groups having corresponding reference patterns (step 303). In step 305, the appropriate reference pattern is reference by the fraud detection system 101, which then performs a comparison of the monitored usage pattern with the retrieved reference pattern, as in step 307. The fraud detection system 101 next determines whether a deviation exists between the two patterns, per step 309. If a deviation is determined, then the account is likely encountering fraudulent use (step 311).

Figure 4:
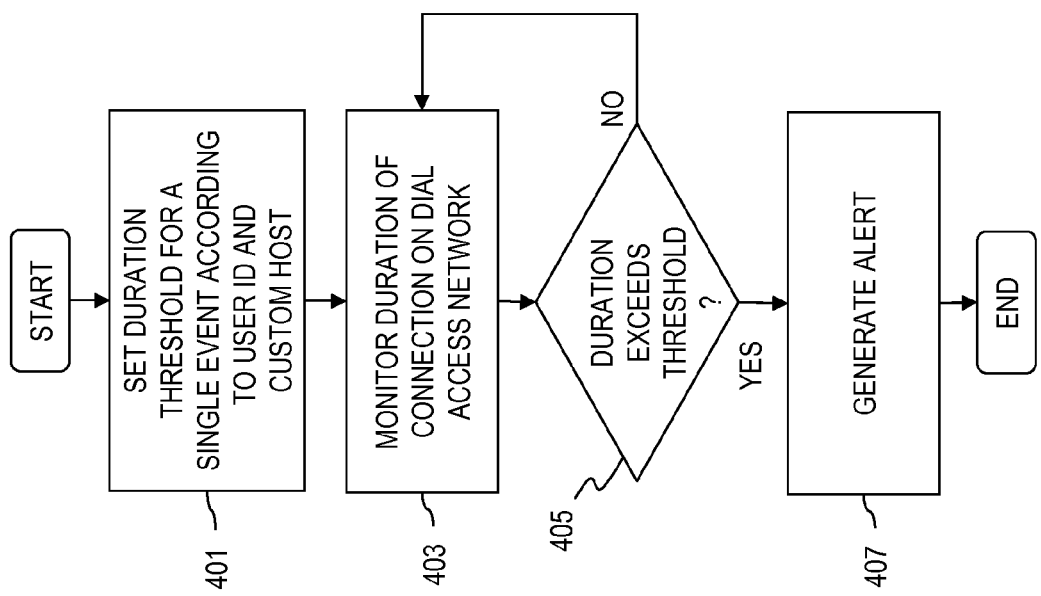
FIG. 4 is a flowchart of a fraud detection process of a single event exhibiting a long duration, according to an embodiment of the present invention.

FIG. 4 is a flowchart of a fraud detection process of a single event exhibiting a long duration, according to an embodiment of the present invention. An LDur alarm is generated when the totalSessionDuration for a single billed connection meets or exceeds a default duration threshold x, defined, for example, in seconds. Additionally, LDur thresholds are allowed to be set by customized hostUserId and host for a specific originating country, such that thresholds can be applied in the following order: hostUserID, host, and default.

Per step 401, a duration threshold is set for a single event (i.e., single activity involving a communication session) according to User ID (identification) and custom host. The duration of the connection established over the WAN 103 is monitored, per step 403. If the duration of the single communication session exceeds a predetermined threshold, as determined by step 405, the fraud detection system 101 generates an alert, as in step 407.

Figure 5:
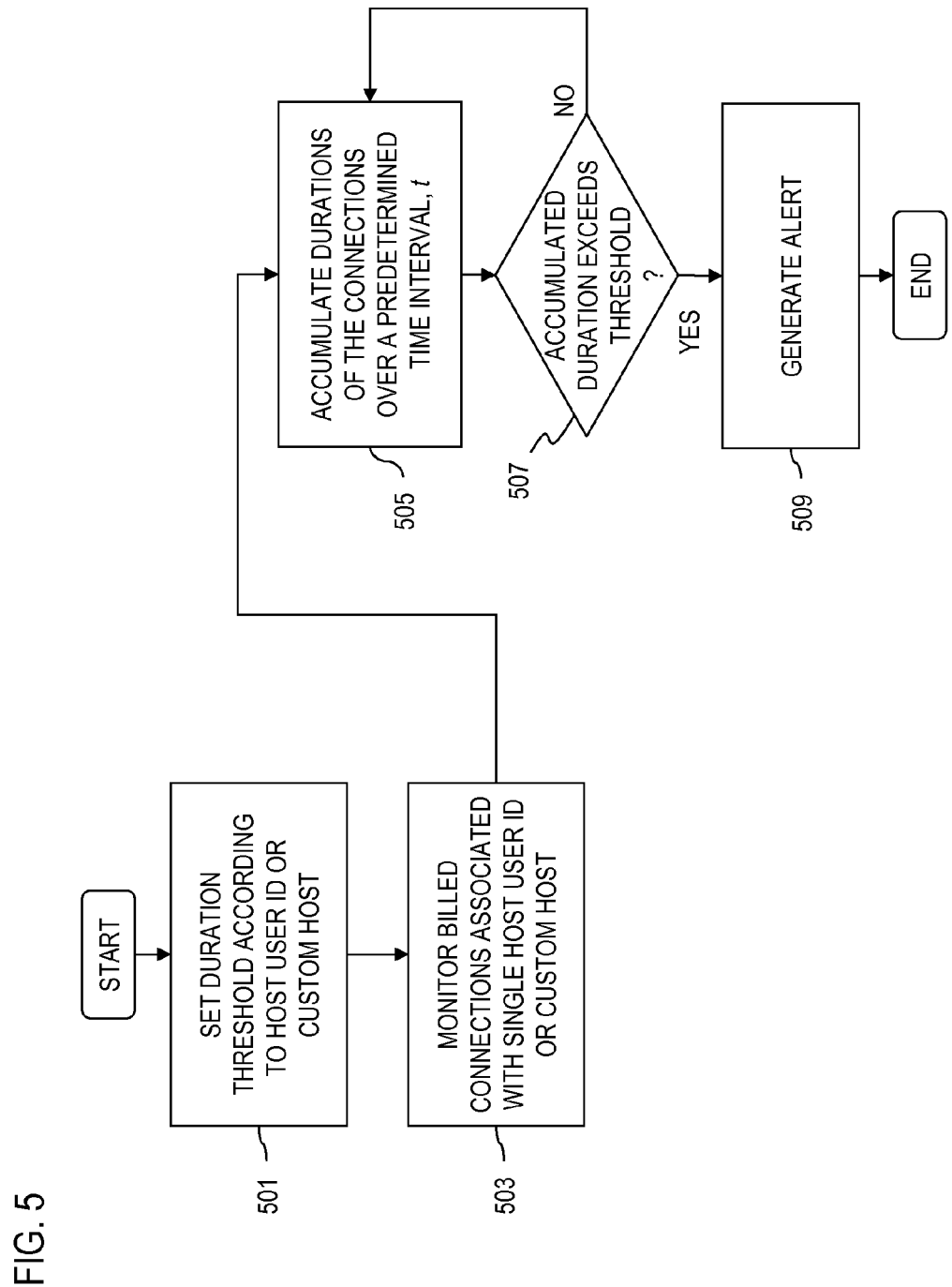
FIG. 5 is a flowchart of a fraud detection process using an accumulated duration associated with a host user identifier (ID), according to an embodiment of the present invention.

FIG. 5 is a flowchart of a fraud detection process using an accumulated duration associated with a host user identifier (ID), according to an embodiment of the present invention. In this scenario, a duration threshold is set, per step 501, according to either a host user ID or a custom host. The fraud detection system 101 monitors the billed connections associated with a single host user ID or a custom host, per step 503. The durations of the connections are thereafter accumulated, or totaled over a predetermined time interval, t (step 505). The fraud detection system 101, per step 507, determines whether the accumulated duration exceeds a predetermined threshold, whereby an alert if generated by the fraud detection system 101 if the threshold is exceeded (step 509).

In other words, an ADurUser alarm is generated when the duration of one or more billed connections on the same hostUserId meets or exceeds a default threshold for cumulative duration x, over an interval of time t (e.g., defined in seconds). The system 101 supports a configurable single definition for ADurUser time t (the interval t will not be customizable). For example, when one or more billed connections to CorpA: user1 meets or exceeds a duration of 2500 minutes (150,000 seconds) for a 24 hour window, an alarm would be generated. Additionally, ADurUser duration thresholds are allowed to be set by customized hostUserId or customized host. The duration thresholds, according to an exemplary embodiment, are applied in the following order: custom hostUserId, custom host, and default. Also, predefined hostUserIds or hosts are allowed to be exempted from this alarm type.

Figure 6:
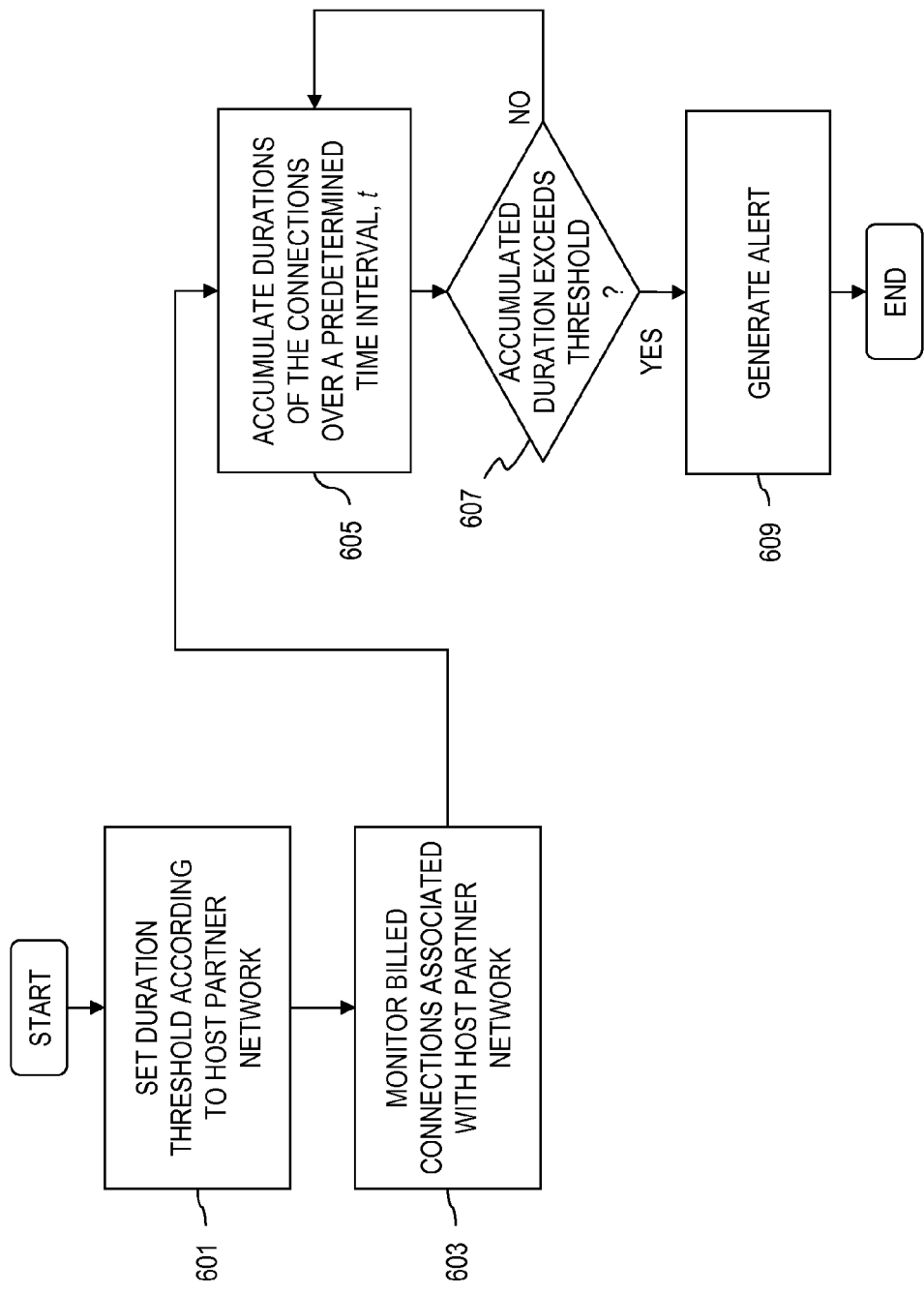
FIG. 6 is a flowchart of a fraud detection process using an accumulated duration associated with a host network, according to an embodiment of the present invention.

FIG. 6 is a flowchart of a fraud detection process using an accumulated duration associated with a host network, according to an embodiment of the present invention. Similar to the process of FIG. 5, a duration threshold is set, per step 601; however, in this example, the threshold is based on the host partner network. In step 603, the fraud detection system 101 monitors the billed connections associated with the host partner network. The durations of the connections are accumulated over a predetermined time interval, t (step 605). The fraud detection system 101, per step 607, determines whether the accumulated duration exceeds a predetermined threshold. If the threshold is exceeded, the fraud detection system 101 generates an alert (step 609).

An ADurNw alarm is generated when the duration of one or more billed connections on the same hostPartnerNw meets or exceeds a default threshold for cumulative duration x, over an interval of time t (defined in seconds). For example, when one or more billed connections to a particular host 115 meets or exceeds a duration of 300 minutes (18,000 seconds) for a 24 hour window, an alarm is generated. Additionally, ADurNw duration thresholds are allowed to be set by customized hostPartnerNw or customized network, such thresholds can be applied in the follow sequence: custom hostPartnerNw, custom partnerNetwork, and default. The system 101 can elect to not apply fraud detection to certain networks.

Figure 7:
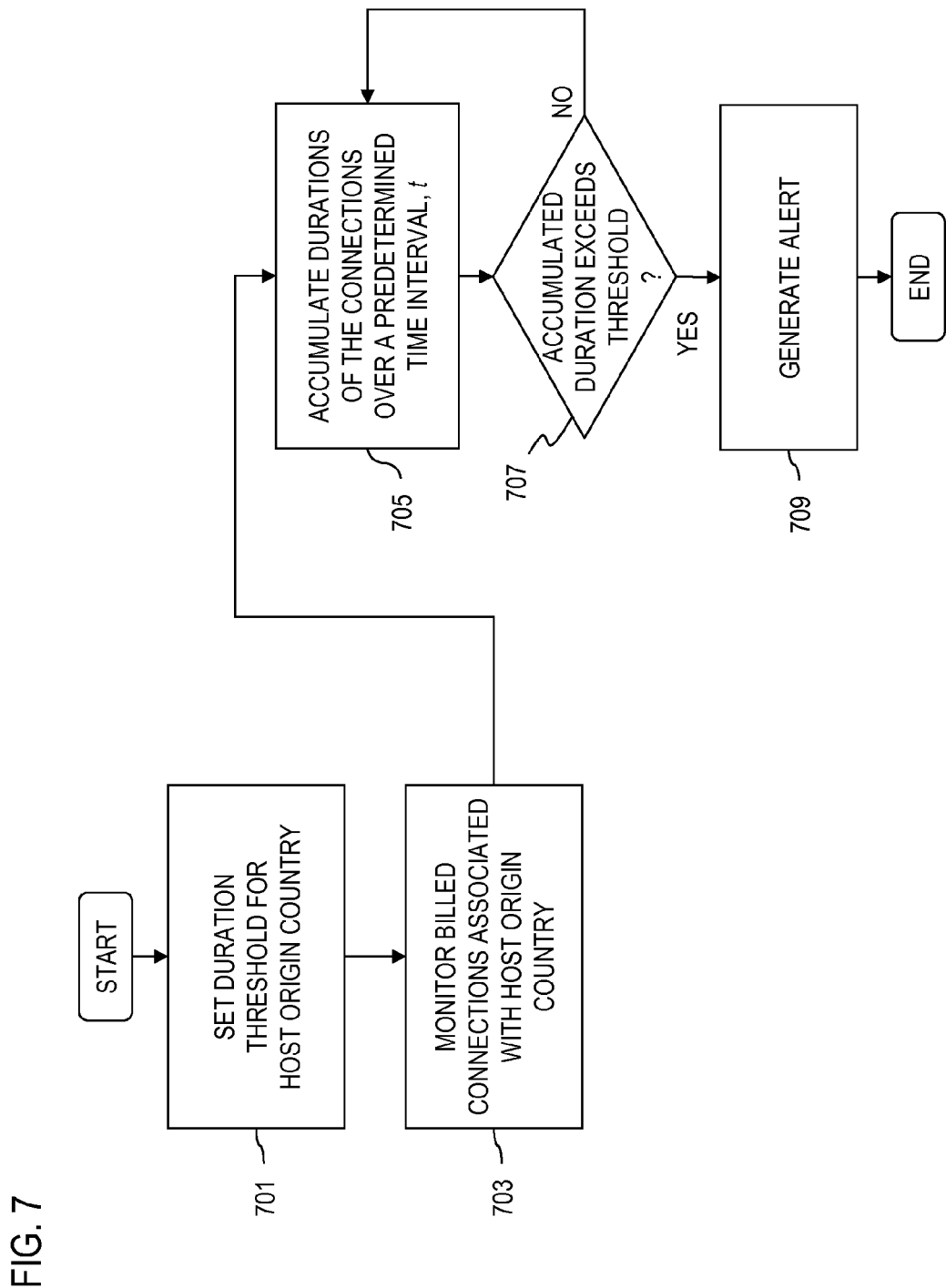
FIG. 7 is a flowchart of a fraud detection process using an accumulated duration associated with a host origin country, according to an embodiment of the present invention.

FIG. 7 is a flowchart of a fraud detection process using an accumulated duration associated with a host origin country, according to an embodiment of the present invention. In this example, a duration threshold is set, per step 701, according to a host origin country. The fraud detection system 101 monitors the billed connections associated with the host origin country, per step 703. The durations of these connections are totaled over a predetermined time interval, t (step 705). The accumulated duration is then compared with a predetermined threshold, as in step 707. The fraud detection system 101 generates an alert if the threshold is exceeded (step 709). Duration thresholds can be applied according to the following order; hostOrigCountry, origCountryName, and default.

In other words, an ADurCtry alarm is generated when the duration of one or more billed connections on the same host OrigCountry meets or exceeds a threshold for cumulative duration x, over an interval of time t (e.g., defined in seconds). For example, when one or more billed connections to HostB: Russia meets or exceeds a duration of 1000 minutes (i.e., 60,000 seconds) for a 24 hour window, an alarm would be generated. Additionally, ADurCtry duration thresholds are allowed to be set by customized hostOrigCountry or customized origCountryName.

Further, the fraud detection system 101 can exempt certain hostOrigCountries or origCountries from this alarm type.

Figure 8:
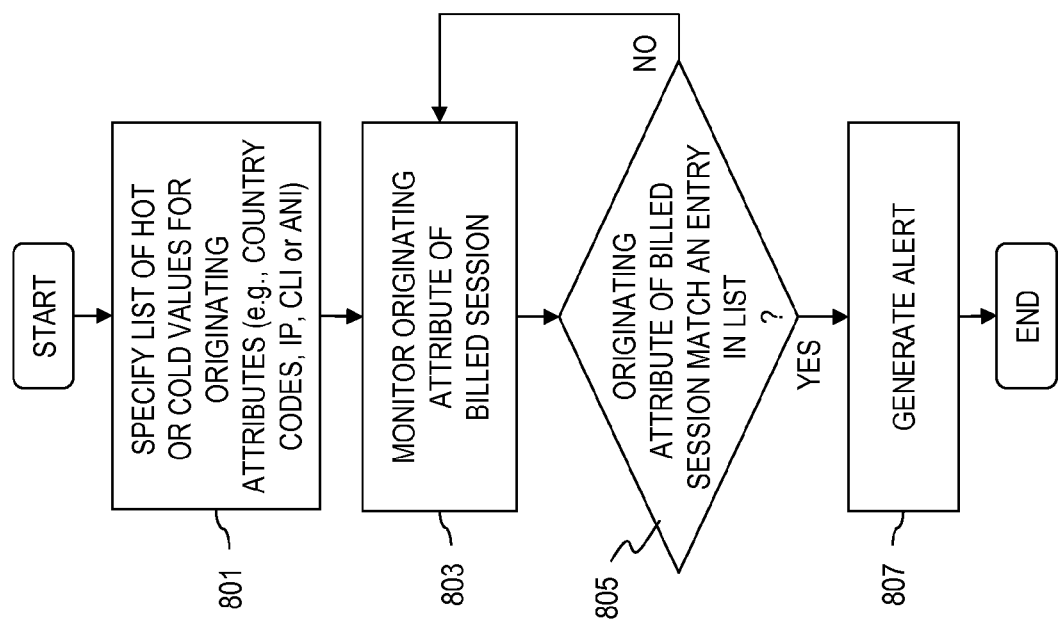
FIG. 8 is a flowchart of a fraud detection process of a single event associated with an origin attribute specified as part of predetermined lists of attributes having a history of fraudulent activities, according to an embodiment of the present invention.

FIG. 8 is a flowchart of a fraud detection process of a single event associated with an origin attribute specified as part of predetermined lists of attributes having a history of fraudulent activities, according to an embodiment of the present invention. According to one embodiment of the present invention, the attributes include country codes, PSTN (CLI or ANI), IP, etc. For example, a Hot Originating Country (HOC) alarm is generated when a billed session originates (origCountryCode) from country x. As mentioned earlier, these attributes could be specified as "Cold." Origination x is contained on a predefined list of suspect country codes.

In step 801, a list of hot or cold values for the originating attributes are specified. The fraud detection system 101 monitors the originating attribute of the billed session, as in step 803, and compares this information with the list. If the fraud detection system 101 determines a match, as in step 805, then an alert is generated (step 807).

Figure 9:
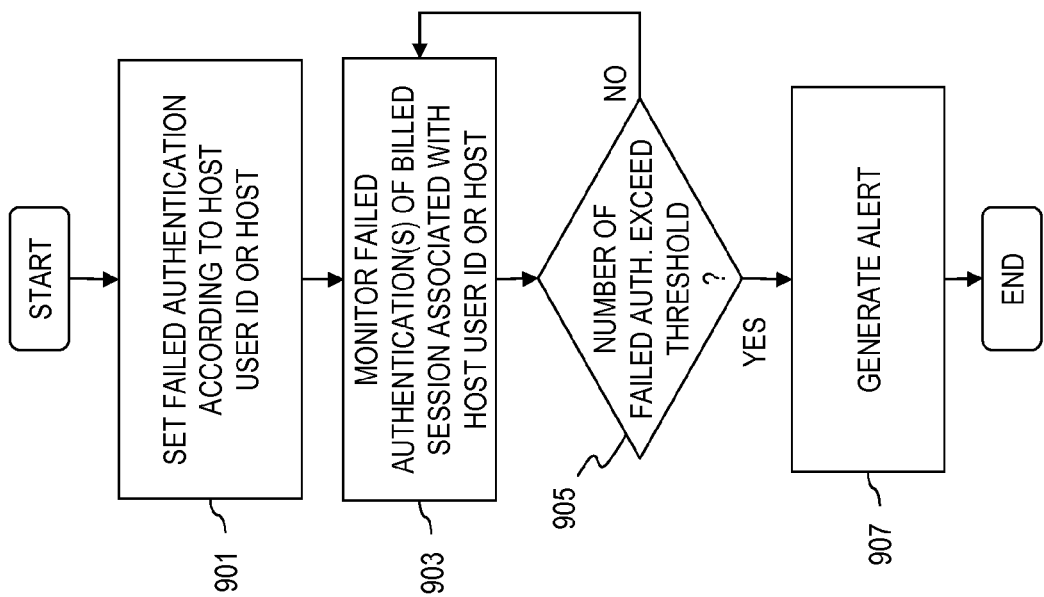
FIG. 9 is a flowchart of a fraud detection process based on failed authentication attempts, according to an embodiment of the present invention.

FIG. 9 is a flowchart of a fraud detection process based on failed authentication attempts, according to an embodiment of the present invention. In step 901, a threshold value for the number of failed authentications is set according to a host User ID. Alternatively, the threshold can be applied in the following order: host User ID, host, and default. The fraud detection system 101 then monitors the number of failed authentications of a billed session associated with the host User ID (or the host) over a predetermined interval of time (e.g., 24 hours), per step 903. The fraud detection system then determines whether the threshold is exceeded based on the monitoring process, as in step 905. An alert (e.g., FAuth alarm) is generated if the threshold is exceeded (step 907).

The fraud detection system 101 of FIG. 1 advantageously provides profiling on an account-by-account basis. According to various embodiments, the real-time nature of the data collection and processing of such information enhances the efficiency and accuracy of detecting fraudulent use of data communication services.

According to one embodiment of the present invention, the thresholds utilized in the processes of FIGS. 4-9 can be assigned different levels of precedence or severity (independent of the specificity). Under this approach, if a particular threshold of a certain precedence is exceeded or otherwise satisfied, this can trigger the inclusion of information relating to the threshold in the fraud alert itself. In some installations, fraud analysts may consider some threshold violations to be of greater significance than others and may prefer to that certain threshold violations are selectively reported in lieu of others according to some order of precedence. Whereas a given connection duration may indeed exceed several thresholds, a precedence may be established such that one of the threshold violation conditions is preferentially reported in a fraud alert, the others being viewed as subordinate in importance for fraud analysis purposes. This practice focuses attention on the most noteworthy threshold violations. In accordance with an exemplary embodiment, a precedence order is enabled, determining which of multiple violations is to be included in a fraud alert, by performing threshold comparisons in a particular sequence, such as in order of most specific to least specific. For example, a threshold applicable to a specific host and userID combination will be tested before a threshold generally applicable to the host regardless of user ID. As another example of decreasing specificity, a threshold applicable to a particular region in a country will be tested before a threshold applicable to the country "at large". The total number of criteria specified for the threshold is an indication of relative specificity, as well as the specificity expressed by particular values of a criterion. As various thresholds are tested in sequence, the first threshold violation encountered triggers a fraud alert based on the violation and other thresholds need not be tested.

This deliberate sequencing of thresholds comparisons to implement a precedence order improves processing efficiency by providing an 'early out' approach during execution. Once a threshold violation of high priority has been detected, then it is unnecessary to perform further comparisons as they will be preempted by the greater precedence violation anyway. It should be recognized, however, that other mechanisms may be used to implement an arbitrary precedence order among threshold comparisons without departing from the spirit and scope of the present invention. Many variations are possible and may have usefulness in some implementations. For example, precedence of threshold violations may be related to relative severity, such as the extent to which the threshold is exceeded. In some implementations, all thresholds may be tested to detect violations even after a significant violation has already been detected. Reporting precedence, if any, may be processed after the thresholds have been checked. In some implementations, it is also envisioned that a fraud alert may selectively include aspects of more than one threshold violation.

It should be generally noted that for every unique combination of connection attribute criteria for which a threshold has been set, it may be useful to maintain a counter that is incremented for each connection fulfilling the criteria.

Figure 10:
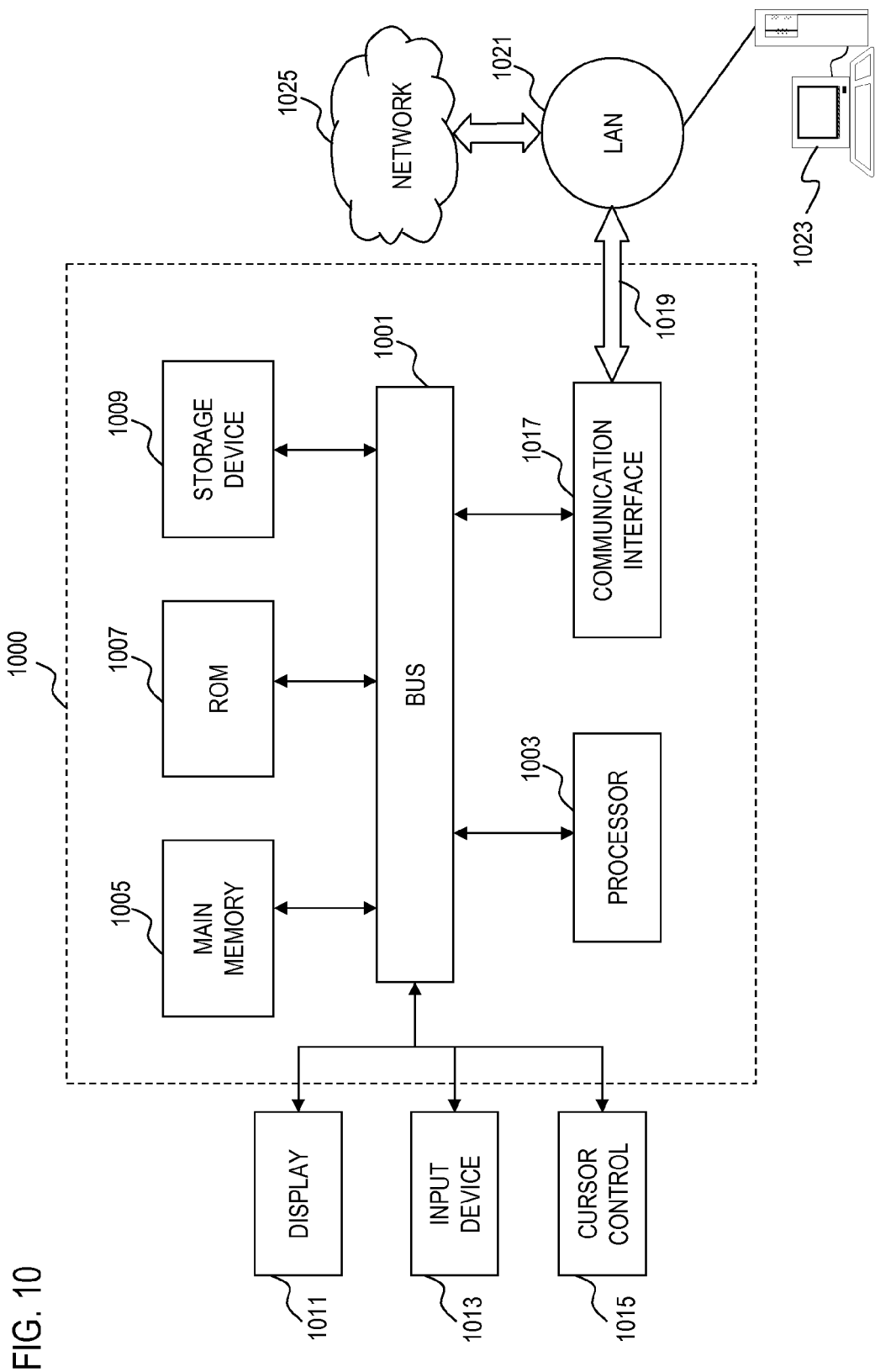
FIG. 10 is a diagram of a computer system that can be used to implement an embodiment of the present invention.

FIG. 10 illustrates a computer system 1000 upon which an embodiment according to the present invention can be implemented. For example, the client and server processes for supporting fleet and asset management can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the processes of the fraud detection system 101 are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1005 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The following patent applications are incorporated in their entireties: co-pending U.S. patent application Ser. No. 11/141,373 filed May 31, 2005, entitled "Method and Apparatus for Providing Fraud Detection Using Geographically Differented Connection Duration Thresholds"; co-pending U.S. patenta pplication Ser. No. 11/141,369 filed May 31, 2005, entitled "Method and Apparatus for Providing Fraud Detection Using Connection Frequency and Cumulative Duration Thresholds"; co-pending U.S. patent application Ser. No. 11/141,377 filed May 31, 2005, entitled "Method and Apparatus for Providing Fraud Detection Using Connection Frequency Thresholds"; and co-pending U.S. patent application Ser. No. 11/141,352 filed May 31, 2005, entitled "Method and System for Prioritizing Cases for Fraud Detection."

While the present invention has been described in connection with a number of embodiments and implementations, the present invention is not so limited but covers various obvious modifications and equivalent arrangements, which fall within the purview of the appended claims.

What is claimed is:

1. A method comprising:
    retrieving an event attribute associated with a data call involving an end user host, wherein the data call corresponds to a data service, and the event attribute specifies a network address of the end user host;
    comparing the event attribute with a predetermined value; and
    selectively generating, based on the comparison, an alert indicating possible unauthorized use of the data service.

2. A method according to claim 1, wherein the data call is a dial-up call.

3. A method according to claim 1, further comprising:
    periodically receiving information about a monitored activity that includes the data call.

4. A method according to claim 3, wherein the information is received while the data call is in progress.

5. A method according to claim 3, wherein the event attribute is among a plurality of event attributes that relate to either number of failed log-in attempts, duration of the data call, cost of the data call, one or more countries exhibiting high fraud, number of geographically scattered or simultaneous communication sessions for a given account associated with the data call, or a combination thereof.

6. A method according to claim 1, further comprising:
    determining whether the data call is an event that includes either a billed connection event or a failed authentication event.

7. A method according to claim 1, further comprising:
    retrieving another event attribute associated with the data call, wherein the other event attribute specifies a country code of the data call, and the alert is further based on the other event attribute.

8. An apparatus comprising:
    at least one processor; and
    at least one memory including computer program code,
    the at least one memory and the computer program code configured to, with the at least one processor, cause the apparatus to perform at least the following,
    retrieve an event attribute associated with a data call involving an end user host, wherein the data call corresponds to a data service, and the event attribute specifies a network address of the end user host;
    compare the event attribute with a predetermined value; and
    selectively generate, based on the comparison, an alert indicating possible unauthorized use of the data service.

9. An apparatus according to claim 8, wherein the data call is a dial-up call.

10. An apparatus according to claim 8, wherein the apparatus is further caused, at least in part, to:
    periodically receive information about a monitored activity that includes the data call.

11. An apparatus according to claim 10, wherein the information is received while the data call is in progress.

12. An apparatus according to claim 10, wherein the event attribute is among a plurality of event attributes that relate to either number of failed log-in attempts, duration of the data call, cost of the data call, one or more countries exhibiting high fraud, number of geographically scattered or simultaneous communication sessions for a given account associated with the data call, or a combination thereof.

13. An apparatus according to claim 8, wherein the apparatus is further caused, at least in part, to:
    determine whether the data call is an event that includes either a billed connection event or a failed authentication event.

14. An apparatus according to claim 8, wherein the apparatus is further caused, at least in part, to:
    retrieve another event attribute associated with the data call, wherein the other event attribute specifies a country code of the data call, and the alert is further based on the other event attribute.

15. A non-transitory computer-readable storage medium carrying one or more sequences of one or more instructions which, when executed by one or more processors, cause an apparatus to at least perform the following steps:
    retrieving an event attribute associated with a data call involving an end user host, wherein the data call corresponds to a data service, and the event attribute specifies a network address of the end user host;
    comparing the event attribute with a predetermined value; and
    selectively generating, based on the comparison, an alert indicating possible unauthorized use of the data service.

16. A non-transitory computer-readable storage medium according to claim 15, wherein the data call is a dial-up call.

17. A non-transitory computer-readable storage medium according to claim 15, wherein the apparatus is caused, at least in part, to further perform:
    periodically receiving, during progress of the data call, information about a monitored activity that includes the data call.

18. A non-transitory computer-readable storage medium according to claim 17, wherein the event attribute is among a plurality of event attributes that relate to either number of failed log-in attempts, duration of the data call, cost of the data call, one or more countries exhibiting high fraud, number of geographically scattered or simultaneous communication sessions for a given account associated with the data call, or a combination thereof.

19. A non-transitory computer-readable storage medium according to claim 15, wherein the apparatus is caused, at least in part, to further perform:
    determining whether the data call is an event that includes either a billed connection event or a failed authentication event.

20. A non-transitory computer-readable storage medium according to claim 15, wherein the apparatus is caused, at least in part, to further perform:
    retrieving another event attribute associated with the data call, wherein the other event attribute specifies a country code of the data call, and the alert is further based on the other event attribute.

* * * * *